(12) United States Patent  
Wickliffe

(10) Patent No.: US 7,951,028 B2
(45) Date of Patent: May 31, 2011

(54) FRONT DERAILLEUR AND CHAIN GUIDE

(76) Inventor: Christopher A. Wickliffe, Ogden, UT (US)

(*) Notice: Subject to any disclaimer, the term of this patent is extended or adjusted under 35 U.S.C. 154(b) by 1024 days.

(21) Appl. No.: 11/155,311

(22) Filed: Jun. 17, 2005

(65) Prior Publication Data

US 2006/0019782 A1 Jan. 26, 2006

Related U.S. Application Data

(63) Continuation-in-part of application No. 10/201,849, filed on Jul. 23, 2002, now Pat. No. 7,025,698, which is a continuation-in-part of application No. 09/488,657, filed on Jan. 20, 2000, now Pat. No. 6,454,671.

(51) Int. Cl.
    F16H 63/00 (2006.01)
(52) U.S. Cl. .......................................... 474/80

(58) Field of Classification Search .................... 474/80, 474/78, 82, 101, 79, 69, 117, 140, 144
See application file for complete search history.

(56) References Cited

U.S. PATENT DOCUMENTS

| 3,742,777 | A | * | 7/1973 | Mathauser | 474/81 |
| 5,607,367 | A | * | 3/1997 | Patterson | 474/80 |
| 5,649,877 | A | * | 7/1997 | Patterson | 474/80 |
| 5,688,200 | A | * | 11/1997 | White | 474/80 |

* cited by examiner

Primary Examiner — Bradley T King
Assistant Examiner — Thomas Irvin
(74) Attorney, Agent, or Firm — Morriss O'Bryant Compagni

(57) ABSTRACT

A front derailleur including a chain guide for engagement and disengagement of a bicycle chain with multiple chain rings of a crankset is disclosed. The chain guide may be positioned by linear guide rods. The chain guide may have an inner lifting surface and an outer pulling surface for engaging diametrically opposed corners of a chain when viewed in cross-section.

19 Claims, 32 Drawing Sheets

FRONT DERAILLEUR AND CHAIN GUIDE

CROSS-REFERENCE TO RELATED APPLICATIONS

This is a continuation-in-part (CIP) of Ser. No. 10/201,849, filed Jul. 23, 2002, now U.S. Pat. No. 7,025,698, which is a CIP of Ser. No. 09/488,657, filed Jan. 20, 2000, now U.S. Pat. No. 6,454,671. This CIP application is also related to design application Ser. No. 29/210,290, filed, Jul. 29, 2004, pending. All of these related applications are hereby incorporated by reference, for all purposes, as if fully set forth herein.

FIELD OF THE INVENTION

This invention relates generally to bicycle front derailleurs. More specifically, this invention relates to a front derailleur which incorporates a chain guide configured to lift a corner of the bicycle chain (viewed in cross-section) to initiate an upshift and pulls down on an opposite corner to initiate a downshift.

BACKGROUND OF THE INVENTION

Most bicycles have multiple gears with front and rear derailleurs to change gears. A front derailleur is used to shift a bicycle chain between two or more chain rings of a crankset. Chain rings vary in diameter, each having a different number of teeth for engagement with the bicycle chain. The force required to turn the crankset is determined, in part, by the size of the particular chain ring the bicycle chain is engaged with. The size of the chain ring can also determine the number of revolutions that will be required of the crankset in order to travel a certain distance. By changing the chain engagement from a chain ring of one size to another, the bicyclist can strategically choose how much force will be required to be applied to the crankset, as well has how many revolutions the crankset will make in order to travel a relative distance.

Conventional bicycle frames are configured with a seat tube joined at one end to a down tube with a bottom bracket lug. The bottom bracket lug supports the "bottom bracket" consisting of the bottom bracket spindle, bearings, races, lock rings, spacers and the like, that are configured to couple with, and allow rotation of, the crankset. The opposite end of the seat tube conventionally supports a seat post and seat for the rider. A front derailleur is typically mounted on the seat tube of a bicycle frame and near the chain rings. Not all bicycle frames have a complete seat tube. For example, some full-suspension mountain bikes have a short seat tube stub for mounting a front derailleur that serves the purpose of a frame structural member for mounting the front derailleur. For simplicity of discussion, it will be assumed that the term "seat tube" denotes a full conventional seat tube or the more recent short seat tube stub for mounting the front derailleur.

A crankset attaches to opposite ends of a bottom bracket spindle. One arm of the crankset is simply a crank arm with a pedal designed to engage the bottom bracket spindle. The other arm of the crankset may include up to 3 chain rings. A front derailleur is required to shift the chain between the chain rings. The chain rings are typically arranged so as to be concentric with, and parallel to, each other. The smallest chain ring is typically closest to the bicycle frame with the chain rings progressively growing in diameter as they get further from the bike frame. The purpose of a conventional front derailleur is to urge the bicycle chain laterally away from the currently engaged chain ring and towards a chain ring selected by the rider through means of a properly connected shifting device also known as a "shifter." Front derailleurs of various designs have been utilized to perform this function and most have similar features.

Construction and operation of a basic front derailleur are described in U.S. Pat. No. 4,734,083 to Nagano. The Nagano front derailleur includes a member for fixing the front derailleur to the bicycle, a four pin linkage mechanism to effect a pantographic type movement of two guide members, the guide members typically being designated as the inner guide member and the outer guide member. When the assembly is activated to move away from the bicycle frame and toward a larger chain ring, the inner guide pushes the bicycle chain laterally away from the bike frame until the bicycle chain leaves the currently engaged chain ring and engages the next chain ring. The action of urging the bicycle chain onto a larger chain ring often involves the step of pressing the bicycle chain against the side of the larger chain ring. By pressing the bicycle chain against the chain ring, friction combines with the circular motion of the chain ring to "pull" the bicycle chain up and onto the chain ring. When the assembly is activated to move toward the bicycle frame and toward a smaller chain ring, the outer guide urges the bicycle chain in a similar manner, with the outer guide pressing the bicycle chain off of the larger chain ring, and then allowing the bicycle chain to fall onto the smaller chain ring.

The inner and outer guides are spaced at a width which is wider than that of the bicycle chain, often one and a half to two times as wide as the bicycle chain. This allows the bicycle chain to run between the guides without contacting the guides while also allowing for some lateral movement of the bicycle chain which occurs when the bicycle chain is changed from one gear to another by a rear derailleur on a rear sprocket set also referred to as a "cluster" or "cassette". The inner and outer guides each typically comprise a substantially flat elongated surface. The guides are placed substantially parallel to one another and are connected together with a front and rear link. An elongated spatial channel, often referred to as a cage is, thus, defined by the inner and outer guides and the front and rear links. The bicycle chain then passes through the cage without touching the inner and outer guides or the front and rear links during normal operation. There are typically multiple links of chain within the spatial area defined by the cage at any given time.

Conventional front derailleurs move a conventional chain guide in an essentially lateral movement away from or toward the bicycle frame when shifting. There is very little vertical movement associated with conventional front derailleur shifting. For example, a conventional mountain bike front derailleur, such as the Shimano® XTR™ model FD-952 front derailleur, provides approximately 2.1 cm of lateral (horizontal and essentially perpendicular to any plane of any chain ring) movement of the chain guide when shifting from smallest to largest chain ring or vice versa over a triple crankset. As the movement of such a conventional front derailleur is not precisely linear, there is approximately 1-2 mm of vertical movement during a full sweep of the chain guide movement. Similarly, a conventional road bike front derailleur, such as the Campagnolo® Super Record™ front derailleur, popular in the early 1980s for road racing bicycles, provides approximately 1.0 cm of lateral movement of the chain guide when shifting from smallest to largest chain ring or vice versa over a double crankset. Again, this conventional front derailleur is not precisely linear. So, it exhibits approximately 1-2 mm of vertical movement during a full sweep of the chain guide movement.

Thus, there exists a need in the art for a new front derailleur with a chain guide configured to lift a corner of the bicycle chain (as viewed in cross-section) to initiate an up-shift and that pulls down on an opposite corner to initiate a down-shift. Such a chain guide and front derailleur may have improved shifting performance relative to a conventional front derailleur and chain guide.

BRIEF SUMMARY OF THE INVENTION

An embodiment of a front derailleur according to the present invention is disclosed. The embodiment of a front derailleur may include a mounting member configured for attachment to a structural member of a bicycle frame. The embodiment of a front derailleur may further include a chain guide comprising an aperture the periphery of which, when viewed along the direction of bicycle chain travel, forms a simple convex polygon. The embodiment of a front derailleur may further include a positioning assembly configured for attachment to the mounting member and the chain guide, wherein the positioning assembly moves the chain guide in a linear path to the rear and right side of the bicycle frame to which the front derailleur is mounted during an up-shift.

An embodiment of a chain guide for a front derailleur according to the present invention is also disclosed. The embodiment of a chain guide may include an inside lifting surface configured for vertically lifting on a corner of a bicycle chain as viewed in cross-section during an up-shift. The embodiment of a chain guide may further include an outside pulling surface configured for pulling down vertically on an opposite corner of the bicycle chain as viewed in cross-section during a down-shift.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following are brief descriptions of the drawings illustrating exemplary embodiments of the present invention. Like reference numerals refer to like parts in the different views of the drawings. It should be noted that the elements shown within the drawings may not be shown to scale.

FIGS. 31A-C are top, rear and right side drawings of an embodiment of an end cap suitable for use with a positioning assembly in accordance with the embodiment of a front derailleur shown in FIGS. 28-30.

DETAILED DESCRIPTION OF THE INVENTION

Figure 1:
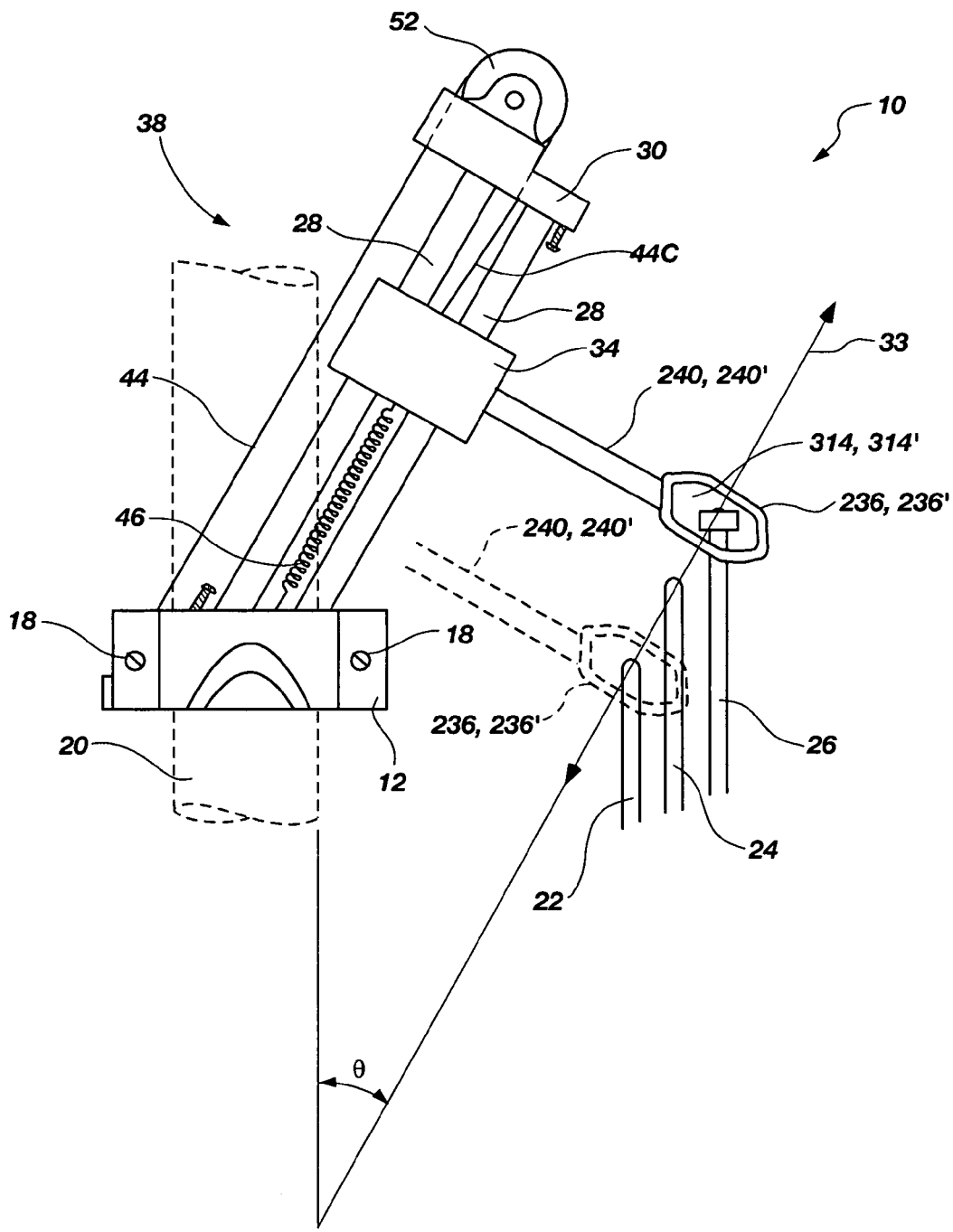
FIG. 1 is a rear view of a front derailleur according to the present invention.
Figure 2:
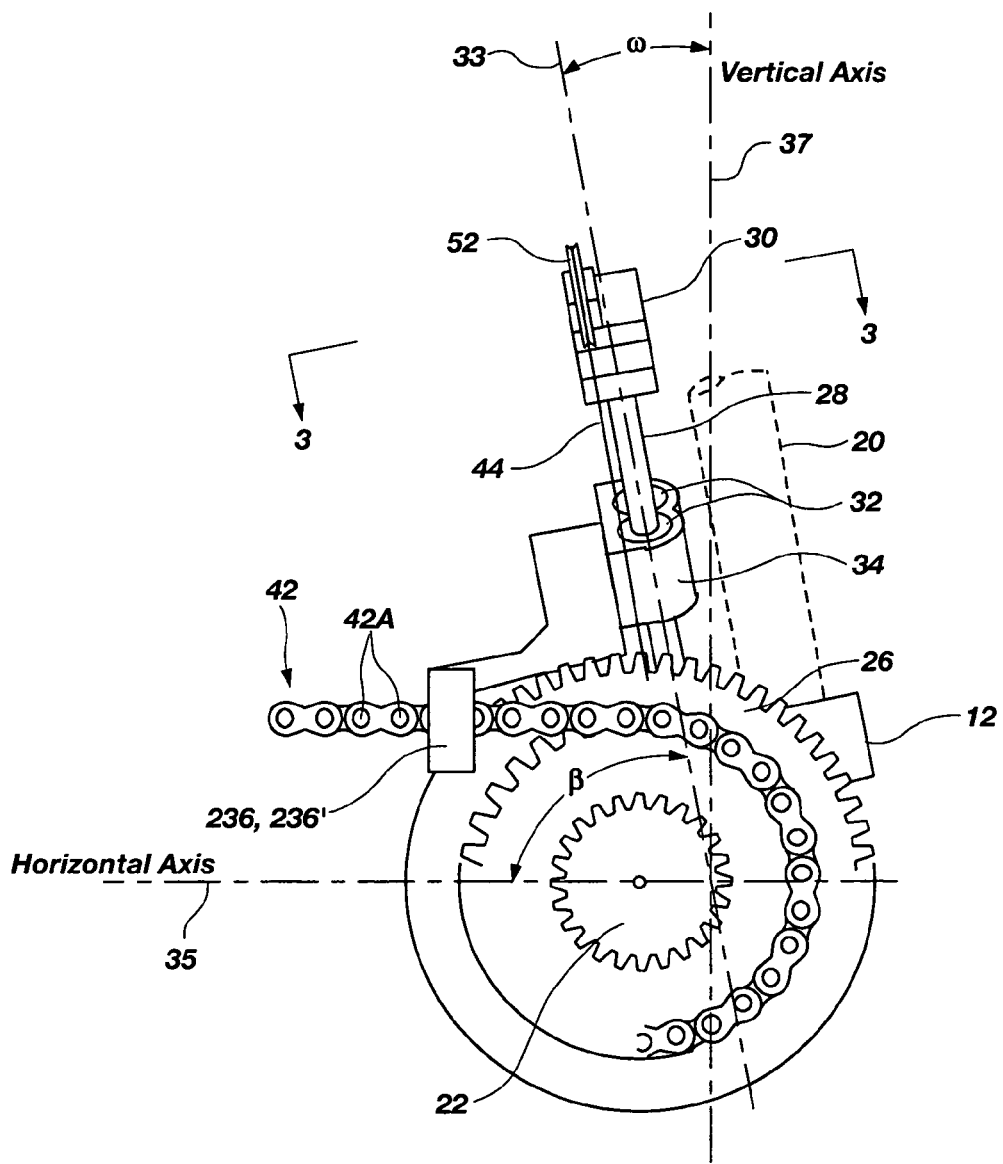
FIG. 2 is a right side view of the embodiment of the invention of FIG. 1.
Figure 3:
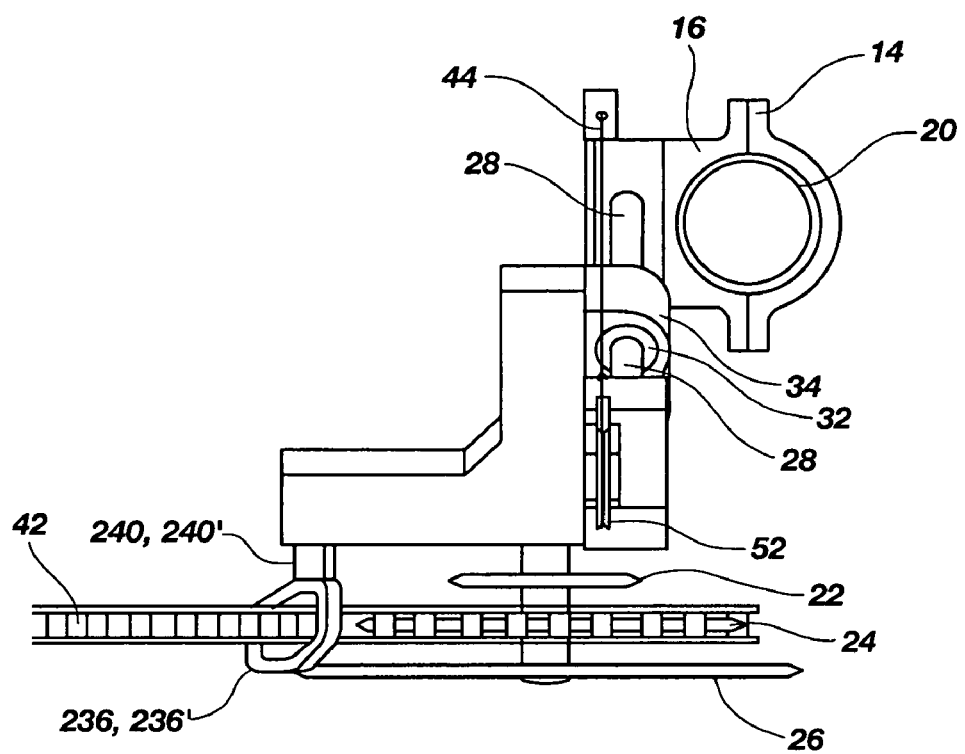
FIG. 3 is a top view of the embodiment of invention of FIGS. 1 and 2, viewed from above and along a direction substantially parallel with the seat tube of a bicycle.

Referring to FIGS. 1-3, an embodiment of a front derailleur 10 is shown. FIG. 1 shows the front derailleur 10 from the rear of a bicycle, i.e., from the rear wheel looking forward. FIG. 2 shows the front derailleur 10 from the right side of the bicycle. FIG. 3 illustrates the front derailleur 10 of FIGS. 1 and 2 from a top view perspective as indicated in FIG. 2. It should be noted that the front derailleur 10 illustrated in FIGS. 1-3 is not necessarily shown to scale.

An embodiment of a front derailleur 10 according to the present invention and as shown in FIG. 1 may generally include a mounting member 12 and a positioning assembly shown generally at 38. Mounting member 12 may be configured for attachment to a bicycle frame member, such as the seat tube 20 (shown in dotted lines), and disposed adjacent to the chain rings 22, 24, and 26 of a bicycle crankset. While three chain rings are shown in FIGS. 1 through 3, it will be apparent to one of ordinary skill in the art that the instant invention may be applied to a bicycle configured with any number of chain rings, e.g., a crankset with only two chain rings.

Figure 10:
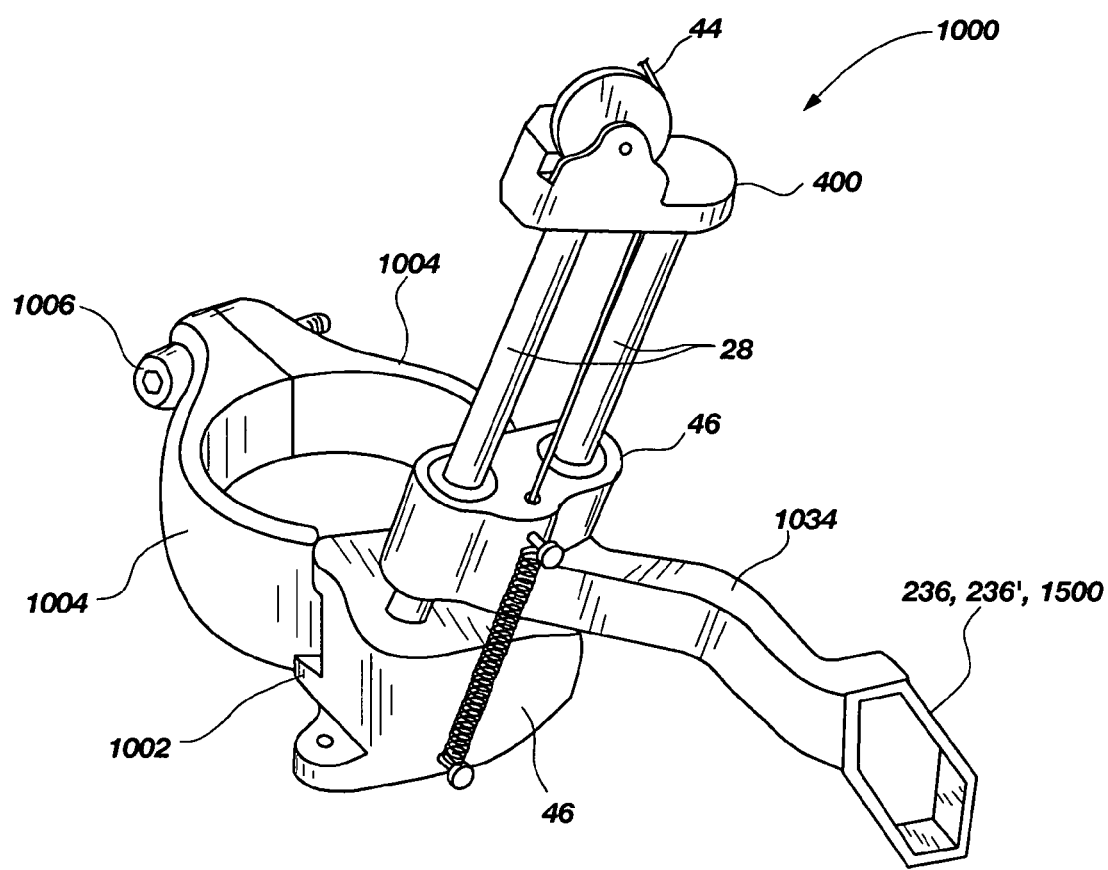
FIG. 10 is a perspective view of a front derailleur including a hinged mounting mechanism in accordance with the present invention.
Figure 11:
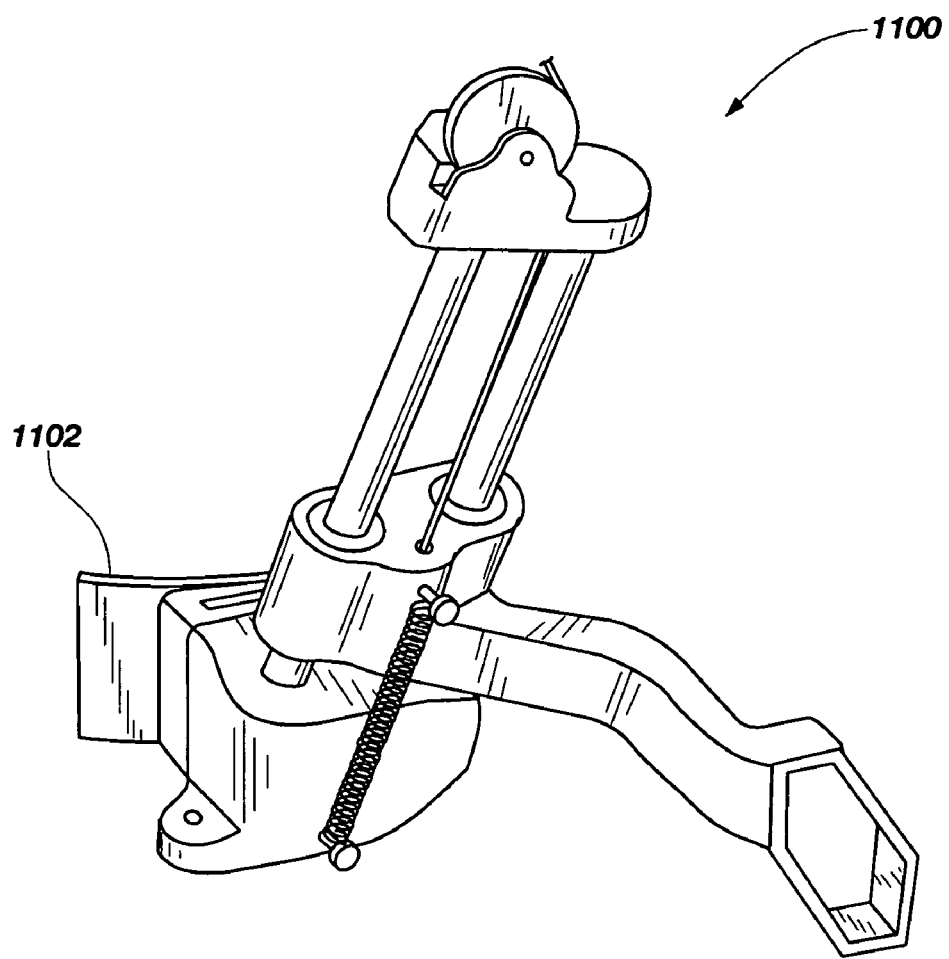
FIG. 11 is a perspective view of a front derailleur including a braze-on mounting mechanism in accordance with the present invention.
Figure 12:
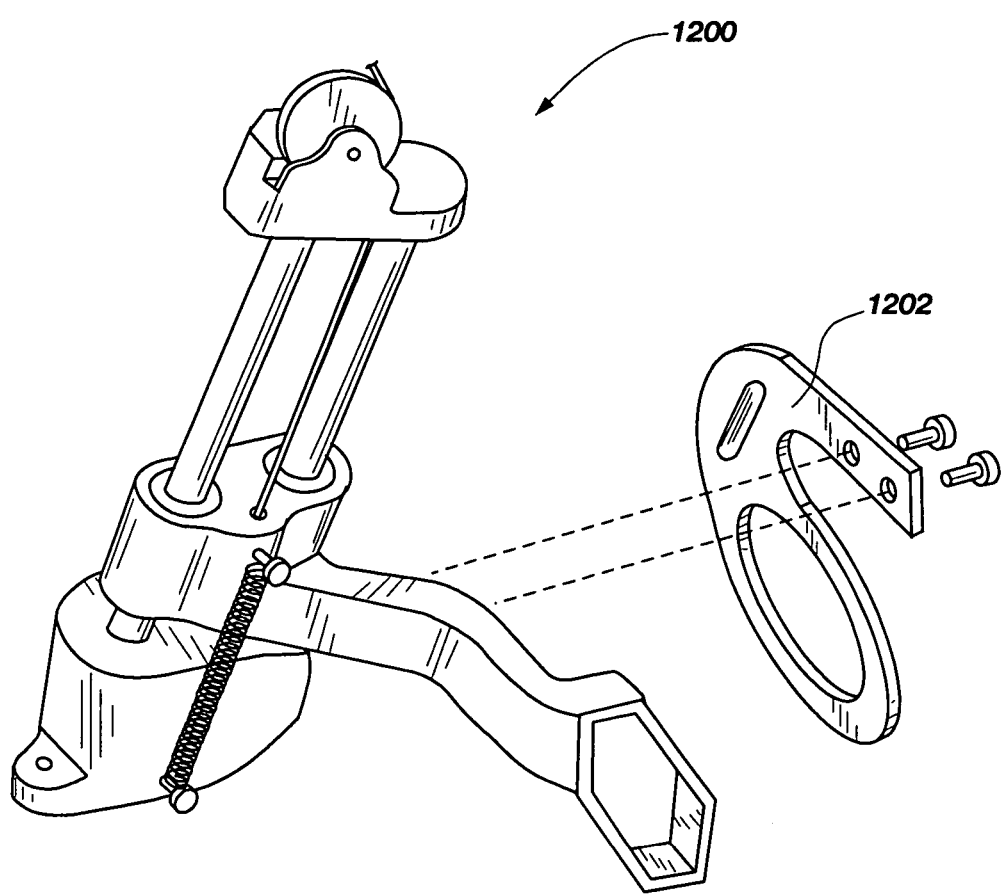
FIG. 12 is a perspective view of a front derailleur including a bottom bracket mounting mechanism in accordance with the present invention.

The mounting member 12 may be a split clamp with suitable diameters allowing for installation on bicycle frames with different sized seat tubes. The mounting member 12 is shown as being a two piece clamping mechanism wherein fasteners 18 provide the clamping action between a front mounting member 14 and a rear mounting member 16. Fasteners 18 may be screws, cam locks, rivets, hinge members or other means for securing members 14 and 16. Mounting member 12 may be a hinged mounting mechanism with a single fastener 18. For example, see hinged mounting mechanism 1002 as shown in FIG. 10 and related discussion, below. It is also contemplated that mounting member 12 may alternatively be a bracket for fastening to a braze-on mount on the seat tube 20 of the bicycle frame. For example, see braze-on mounting mechanism 1102 as shown in FIG. 11 and related discussion, below. Alternatively, mounting member 12 may be a bracket for fastening to another structural member of the bicycle frame, e.g., a bottom bracket. For example, see bottom bracket mounting mechanism 1202 as illustrated in FIG. 12 and related discussion below. All of the above mounting methods are known to one of ordinary skill in the art and thus, are not further described herein.

Referring again to FIG. 1, positioning assembly 38 may include two linear guide rods 28, a structural member 30 and a guide arm 34 housing linear bearings 32 according to an embodiment of the present invention. Two linear guide rods 28 are shown attached to the mounting member 12. The linear guide rods 28 may be cylindrical in shape and may be formed, for example, of a metal such as stainless steel with a polished finish. The linear guide rods 28 are placed next to each other in a parallel orientation. Attached at the top end of the linear guide rods 28 is a structural member 30 for maintaining the parallel relationship of the two linear guide rods 28 and having additional functions as described herein. Guide arm 34 may house two linear bearings 32 (see FIG. 2) which are slidably disposed on and around the linear guide rods 28. The linear guide rods 28 constrain movement of the guide arm 34 along the length of the linear guide rods 28 and at predetermined angles that are unique to the present invention.

As seen in FIG. 1, an angle $\theta$ is defined using the seat tube 20 as a substantially vertical reference line and by drawing a line (or plane into FIG. 1) from the vertical tip (or highest tangent) of the largest chain ring 26 through the vertical tip of the smallest chain ring 22. The linear guide rods 28 are preferably oriented at the angle $\theta$ placing the top of the linear guide bearings 32 laterally away from the bicycle frame towards, and adjacent to, the chain rings 22, 24 and 26. In this configuration the linear guide rods 28 will be parallel with a line drawn through the vertical tips of the largest 26 and smallest chain rings 22. It will be appreciated that the specific value of the angle $\theta$ depends, at least partially, on the sizes and spacing of the chain rings 22, 24, 26 used, and that the invention is not limited to a particular angular value for $\theta$.

Additionally, as seen in FIG. 2, the linear guide rods 28 may be placed at an angle $\beta$ with respect to a horizontal axis 35. The angle $\beta$ may range from approximately 66° and 69° from the horizontal axis 35 according to embodiments of the present invention. Of course, the particular angle of $\beta$ may vary from that particular range of angles and may in part be determined by the various radii of the chain rings 22, 24 and 26. For example, the angle $\beta$ may range from 63° and 72° as measured from the horizontal axis 35 in accordance with other embodiments of the present invention.

It is noted that alternative shapes and designs may be utilized for the linear guide rods 28. For example, the linear guide rods 28 need not be cylindrical. However, whatever shapes the linear guide rods 28 are chosen to be, the linear bearings 32 must be compatible with, and be slidably disposed on, the linear guide rods 28. Likewise, a different number of linear guide rods 28 may be employed, including the use of only one linear guide rod 28 according to another embodiment of the present invention. However, if only one linear guide rod 28 is utilized, other means (such as keying the guide rod 28 with a slot, for example, and then matching the linear bearing 32 to the guide rod 28) must be employed to constrain rotational movement of the guide arm 34.

A chain guide 236, 236' may be attached to the guide arm 34 and positioned so as to receive a bicycle chain 42 therethrough. The chain guide 236, 236' may be formed of stainless steel for strength, durability and corrosion resistance. Additionally, various surface hardening treatments may be applied to the chain guide 236, 236' and other components of the front derailleur 10 to improve wear and anti-corrosion characteristics. Such surface hardening treatments are known to one of ordinary skill in the art and, thus, will not be further elaborated on herein.

Figure 15:
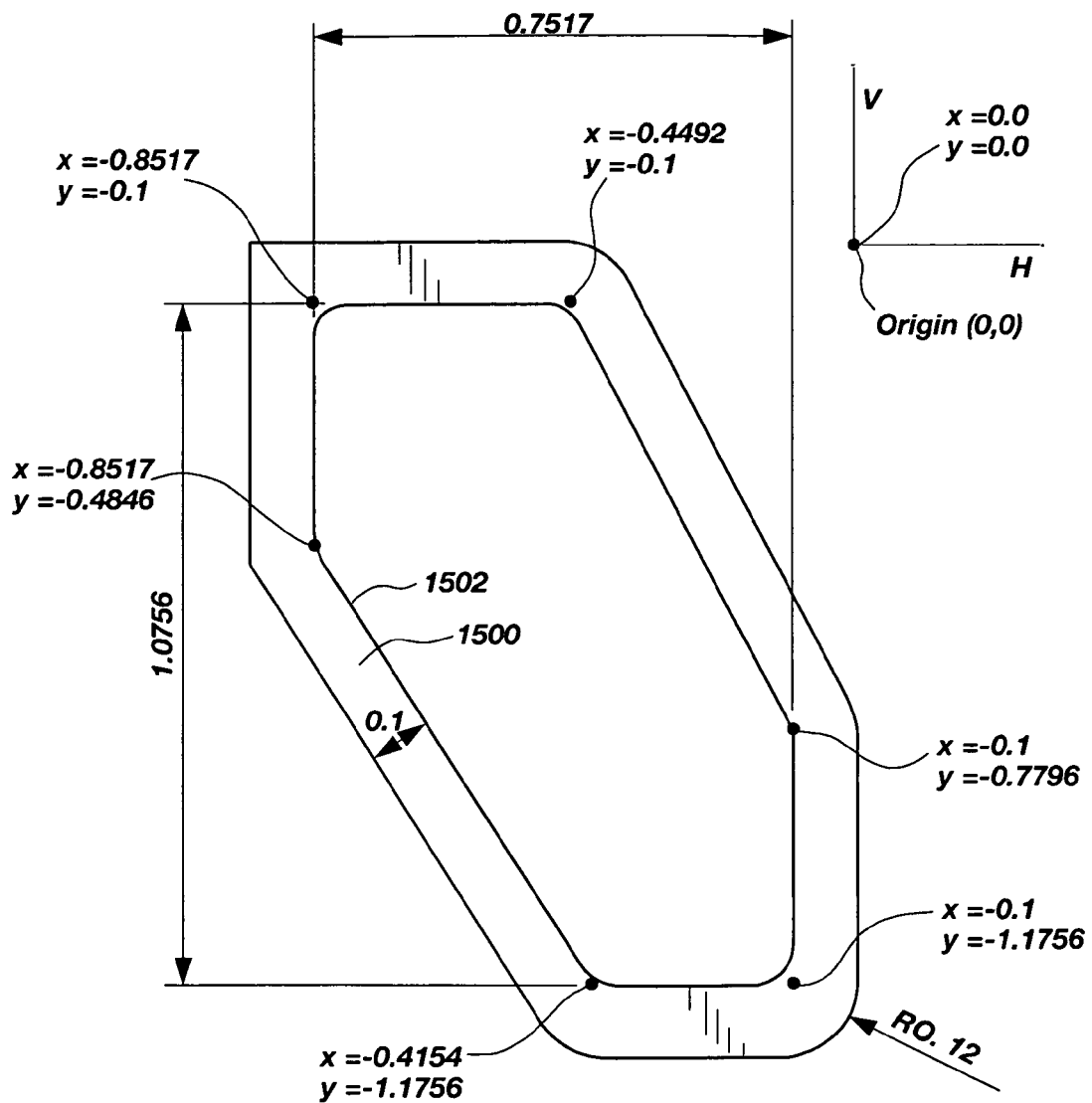
FIG. 15 is a plan view with exemplary dimensions of a presently preferred embodiment of a chain guide according to the present invention.

The term "opening 114, 314, 314', 1502" as used herein refers to an enclosed aperture in the chain guide 90, 236, 236', 900, 1500 through which a bicycle chain 42 is configured to pass. The opening or aperture 114, 314, 314', 1502, as shown in FIGS. 1, 6A, 7A, 8A, 9A, 13A and 15, in the chain guide 236, 236' may be sized slightly larger than the cross-section of the bicycle chain 42. Exemplary dimensions of opening 1502 are shown in FIG. 15. The chain guide 236, 236' may be coupled to the guide arm 34 by means of a stem 240, 240', according to the embodiment illustrated in FIG. 1. The stem 240, 240' may be fixedly attached to the chain guide 236, 236'. The fixed attachment may be accomplished by welding, by bonding methods, by mating threads, or by fasteners. Alternatively, chain guide 236, 236' may be integrally formed with the guide arm 34.

In one embodiment, the stem 240 may be coupled to the guide arm 34 by insertion into a bore (not shown) formed in the guide arm 34. In such an embodiment, the stem 240 may be a pre-selected length which allows for adjustment of the stem 240 axially within the bore. Additionally, the stem 240 may be keyed, for example the stem 240 may be cylindrical with a flat section cut lengthwise on one side of the cylinder. When using such a keyed stem, a set screw (not shown) may be located in the guide arm 34 to press against the flat section of the stem 240 to fix the position of the stem 240, both axially and radially, within the bore.

Other means may be employed for coupling the chain guide 236, 236' to the guide arm 34. For example, the chain guide 236' and stem 240' may be formed as one element either by machining or casting as depicted in FIGS. 10-12, 13A and 13B. Alternatively, an integrated one piece unit may be employed, wherein the stem 240, 240' is eliminated and the chain guide 236, 236' is formed as an integral component of the guide arm 34 as mentioned above. Again, this may be accomplished through either machining or casting of the integrated unit. Such embodiments of the chain guide 236, 236' and guide arm 34 have the benefit of fewer parts required for assembly of the derailleur 10.

Figure 6A:
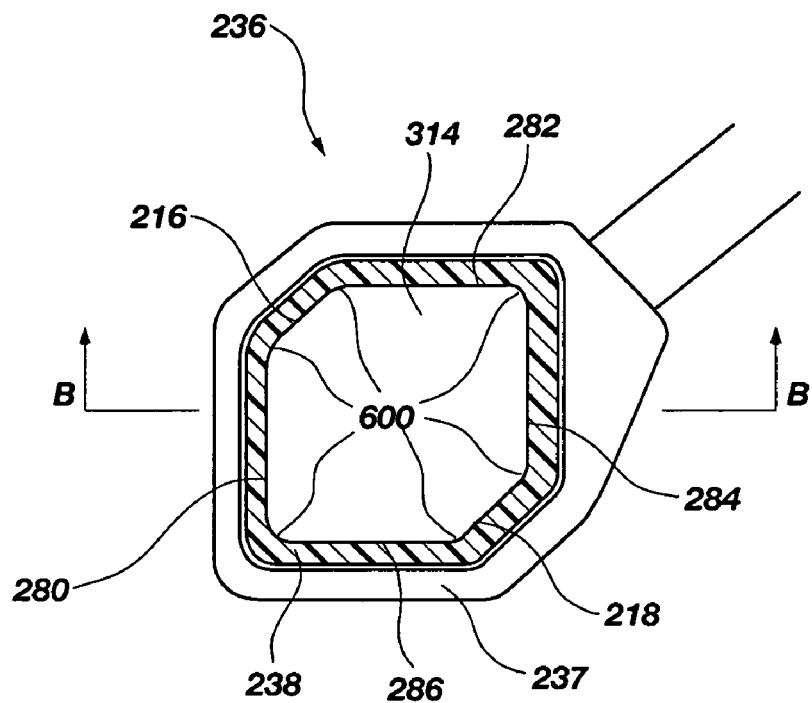
FIGS. 6A and 6B are views of a chain guide according to the present invention and suitable for use with the front derailleur shown in FIGS. 1 through 3.
Figure 6B:
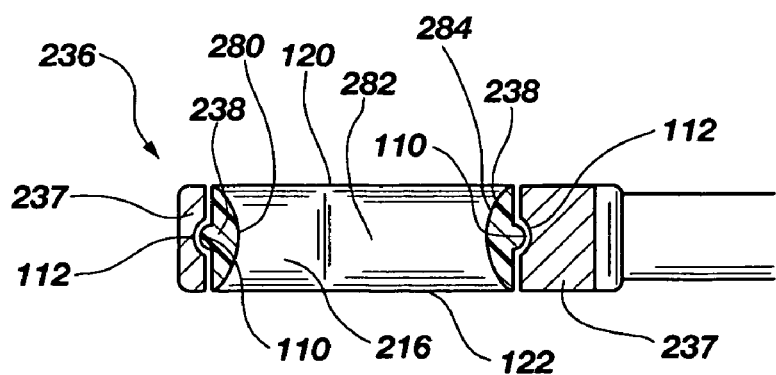

Another embodiment of a chain guide 236 for use with the front derailleur 10 shown in FIGS. 1-3 is depicted in FIGS. 6A and 6B. An insert 238 is housed within an outer rim 237. The insert 238 may be formed of a relatively hard non-metallic material such as nylon, polytetrafluoroethylene (PTFE), or other Teflon®-like, polymer materials which have desirable wear and low friction properties. By placing an insert 238 in this location, the bicycle chain 42 will be in contact with a wear surface which is made of a material softer than that of the bicycle chain 42. This will prevent undue wear on the bicycle chain 42, which wear occurs when any derailleur repeatedly engages a bicycle chain to urge the bicycle chain from one chain ring to another. The opening in the insert 238 may be sized slightly larger than the cross-section of the bicycle chain 42.

Referring to FIG. 6A, the chain guide 236 is shown as being annular, in the sense that it is a substantially continuous band or ring-like element, but which is substantially rectangular or polygonal rather than circular. The corners, both inside and outside, may be rounded. The insert 238 is shown as being sized and shaped to match the inside surface of the outer rim 237. As seen in FIG. 6B, the inside surface of the outer rim 237 and the outer perimeter of the insert 238 are substantially mating parts. A lip 110 is formed on the outer perimeter of the insert 238, and a matching groove 112 is formed along the inside surface of outer rim 237. The insert 238 is coupled to the outer rim 237 by positioning the lip 110 of the insert 238 into the groove 112 of the outer rim 237. The insert 238 may be installed by pressing it into the opening of the outer rim 237 until the lip 110 is securely resting in the groove 112. A small amount of elastic deformation of the insert 238 is allowed to accomplish installation of the insert 238. Alternatively, adhesive may also be used to secure the insert 238 within the chain guide 236 according to another embodiment of the present invention. Removal of the insert 238 may be accomplished in a similar manner by pressing the insert 238 out of the outer rim 237 with an appropriate amount of force or prying it out with a screwdriver or other appropriate tool. Thus, the insert 238 is secured to the outer rim 237 during operation of the bicycle, but may be removed for replacement or for other maintenance requirements as needed.

Referring again to FIG. 6A, the insert 238 defines a polygonal opening 314 through which the bicycle chain 42 passes. The opening 314 is defined by an outer wall 280, an inner wall 284, a top wall 282 and a bottom wall 286. Two corner walls 216 and 218 are also formed in the opening 314. The upper-outer corner wall 216 and lower-inner corner wall 218 are oriented at an angle substantially transverse or perpendicular to the line of movement of the chain guide 236. The corners 600 of the opening 314 may be radiused according to embodiments of the present invention.

By orienting the opening 314 as described above, the upper-outer corner wall 216 acts to pull the bicycle chain 42 both inward and downward during the operation of the derailleur 10 in urging the bicycle chain 42 toward a smaller chain ring. Likewise, the lower-inner corner wall 218 acts to push the bicycle chain 42 both upward and outward when urging the bicycle chain 42 toward a larger chain ring. The shifting action exerted by corner walls 216 and 218 are against corner edges of the bicycle chain 42 when viewed in cross-section, see, e.g., corner walls 2016 and 2018 in FIG. 20. This shifting action of the present invention is distinct from conventional chain guides and front derailleurs which push laterally against the side of bicycle link plates during shifting.

Referring again to FIG. 6A, top and bottom walls 282, 286 and inner and outer walls 284, 280 may be spaced far enough apart to accommodate changes in vertical and lateral position of the chain associated with different rear sprocket positions. Alternatively, opening 314 may be circular, oval, or any other shape which is effective for urging the bicycle chain 42 from one chain ring to another by lifting up or pulling down on corners of the bicycle chain when viewed in cross-section and which does not catch or bind the bicycle chain.

Referring to FIG. 6B, the walls 280, 282, 284, and 286 (not shown because of section view) of the opening 314 may be smooth and rounded as they are traversed from the front side 120 to the back side 122 according to the illustrated embodiment. The rounded and smooth configuration of the opening 314, as particularly shown in cross-section of walls 280 and 284, allows the insert 238 to interact with the bicycle chain 42 while having a minimum amount of surface contact between the bicycle chain 42 and insert 238. This configuration prevents the bicycle chain 42 from catching or binding, and reduces wear on the interacting surfaces. While some rounding of the opening 314 is preferred for the reasons stated above, the amount of rounding shown in FIGS. 6B, 7B, 8B, 9B and 13B may be exaggerated for illustration purposes. Additionally, the opening 314, 314' may have little to no rounding and still be within the scope of other embodiments of the present invention.

Figure 13A:
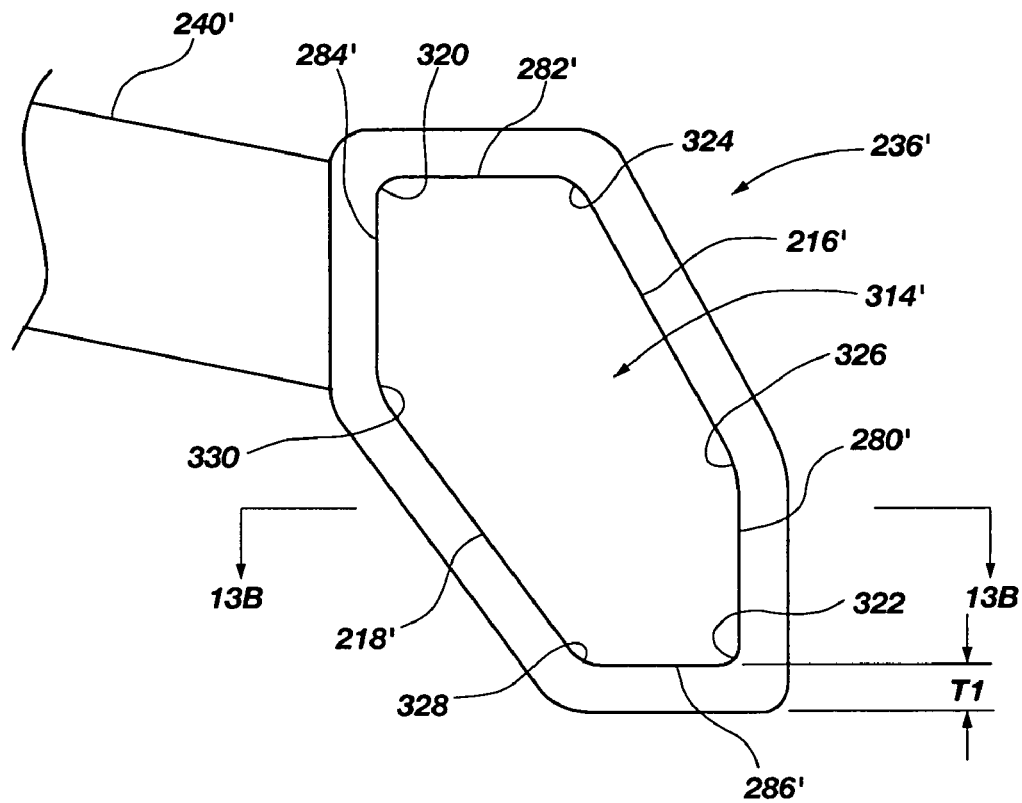
FIGS. 13A and 13B are views of a chain guide according to another embodiment of the present invention.
Figure 13B:
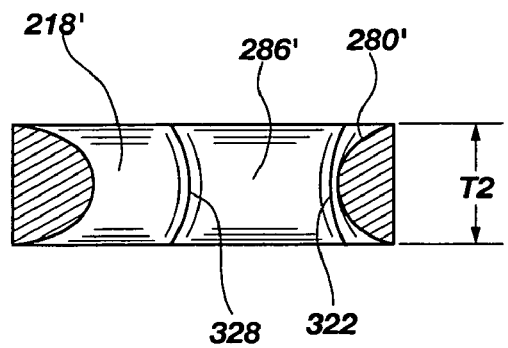

Referring to FIGS. 13A and 13B, another embodiment of the chain guide 236' is shown according to the present invention. The chain guide 236' may include an aperture or opening 314' through which the bicycle chain 42 passes. The outline of opening 314' may be defined generally as a simple convex polygon. As shown, the opening 314' is a six-sided polygon exhibiting two corners 320 and 322 forming substantially right angles, with the remaining corners 324, 326, 328, 330 form substantially obtuse angles. The outline of opening 314' as shown in the view of FIG. 13A, i.e., the direction of chain travel being perpendicularly into or out of the surface of the drawing, is a simple convex polygon because the internal angles defined by corners 320, 322, 324, 326, 328, 330 are all less than 180°.

The opening 314' includes an outer wall 280', an inner wall 284', a top wall 282' and a bottom wall 286' and two opposing corner walls 216' and 218'. The upper-outer corner wall 216' and lower-inner corner wall 218' are oriented at an angle substantially transverse or perpendicular to the line of movement of the chain guide 236' or, in other words, substantially perpendicular to the angle θ (see, FIG. 1). The corners of the opening 314' are radiused to allow a smooth transition between adjacent walls to prevent catching of the chain thereby. By orienting the opening 314' as described above, the upper-outer corner wall 216' acts to pull the bicycle chain 42 both inward and downward, i.e., along the line defined by angle θ, during the operation of the front derailleur 10 in urging the bicycle chain 42 toward a smaller chain ring. Likewise, the lower-inner corner wall 218' acts to push the bicycle chain 42 both upward and outward (again, along the line defined by angle θ) when urging the bicycle chain 42 toward a larger chain ring. The chain guide 236' may be configured such that the corner walls 216' and 218' are the only surfaces making contact with the corners of bicycle chain 42 (when viewed in cross-section, see FIG. 20) during displacement thereof from one chain ring to another. Corner walls 216' and 218' may or may not be parallel to one another according to embodiments of the present invention.

In an embodiment of chain guide 236, the upper and lower walls 282', 286' and the side walls 280', 284' may be configured to exhibit an internal length, i.e., along the outline of opening 314', of less than approximately 0.5 inches when viewed from the perspective shown in FIG. 13A. Additionally, the corner walls 216' and 218' may be configured to exhibit a length of at least approximately 0.7 inches. The simple convex polygon which defines the opening 314' may be configured such that each wall 216', 218', 280', 282', 284', 286' or side of the polygon exhibits a substantially unique length. For example, in one embodiment, the upper wall 282' may exhibit a length of approximately 0.40 inches, the bottom wall 286' approximately 0.32 inches, the inner side wall 284' approximately 0.43 inches, the outer side wall 280' approximately 0.41 inches, the inner corner wall 218' approximately 0.75 inches, and the outer side wall 216' approximately 0.72 inches. The length of the corner walls 216' and 218' may be determined, at least in part, by how many gears are present on the rear sprocket, or the geared drive, coupled with the rear wheel of the bicycle.

The wall thickness, T1, of walls 216', 218', 280', 282', 284' and 286' of the chain guide 236' may be uniform around its periphery with an exemplary thickness T1 being approximately in the range from about 0.1 to about 0.3 inches. In an alternative embodiment, the thickness T1 may vary from one wall to another for manufacturing considerations, or to accommodate expected wear patterns. The depth or overall thickness T2 of the chain guide 236', as shown in FIG. 13B, is desirably a dimension which minimizes contact with the chain 42 while maintaining structural integrity of the chain guide 236'. For example, the depth T2 may range from approximately 0.2 to 0.7 inches.

While FIGS. 2-4, 6A, 6B, 7A, 7B, 8A, 8B, 9A, 9B, 10-12, 13A and 13B describe embodiments of chain guides 236, 236' that are relatively flat and that would fit in between two planes separated by a distance ranging from approximately 0.2 to 0.7 inches, the chain guides of the present invention are not so limited. For example, corner 322 in FIG. 13A may be pulled back, thus, elongating walls 280' and 286', see for example FIGS. 22, 26, 27, 29, 30, 32 and 34. However, the aperture or opening 314', when viewed as in FIG. 13A, exhibits the simple convex polygon characteristics described herein.

In another embodiment of the chain guide 236', the opening 314' may include top, bottom and side walls 282', 286', 280' and 284', respectively, which each exhibit first lengths that are not necessarily identical. In this embodiment, the corner walls 216' and 218' may each exhibit second lengths that are again not necessarily identical but that are greater than the first lengths of top, bottom and side walls 282', 286', 280' and 284, respectively.

Top and bottom walls 282' and 286', respectively, and inner and outer walls 284' and 280', respectively, may be spaced far enough apart to accommodate changes in vertical and lateral position of the chain associated with different rear sprocket positions. Alternatively, opening 314, 314' may be circular, oval, or any other shape which is effective for urging the bicycle chain 42 from one chain ring to another, and which does not catch or bind the bicycle chain 42 and are consistent with the novel aspects of the invention as described herein.

FIG. 15 is a plan view with exemplary dimensions of opening 1502 as viewed in the direction of chain travel for yet another embodiment of a chain guide 1500 according to the present invention. FIG. 15 illustrates internal and external dimensions and (x, y) grid coordinates measured in inches of a six-sided opening 1502 formed by the chain guide 1500 as viewed in the direction of chain travel. The (x, y) grid coordinates are referenced from origin (0, 0) and measured units of inches. FIG. 15 also illustrates and provides exemplary rounding for inside and outside corners of chain guide 1500. The six-sided opening 1502 may enclose a maximum area ranging from about 0.3 to about 0.5 square inches, wherein the area lies in a plane perpendicular to the direction of chain travel. In other words, bicycle chain 42 travels perpendicular to the plane enclosing the maximum area, see FIG. 20 where bicycle chain 42 would travel into, or out of, the paper. This maximum area enclosure is believed to be significantly less than the area enclosed by conventional chain guides as viewed under identical conditions.

Figure 20:
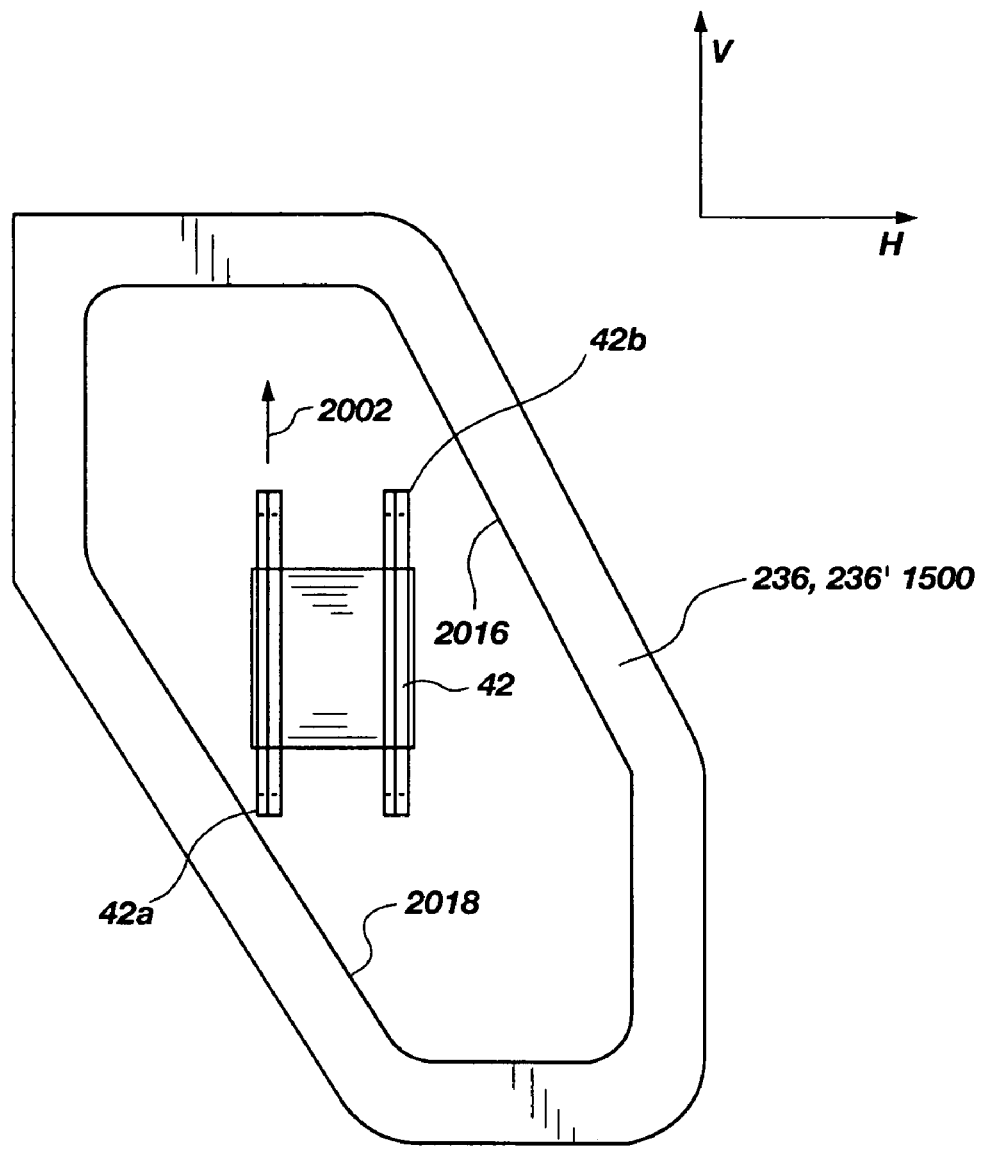
FIG. 20 is cross-section view of a bicycle chain as it engages a chain guide of the present invention during an up-shift as viewed from the rear.

While the outline of aperture or opening 1502 of chain guide 1500 is shown as a simple convex polygon with six (6) sides, other simple convex polygonal shapes are contemplated to be within the scope of the invention, including polygons of five (5) or more sides with or without rounded corners according to embodiments of the present invention. Of course, the dimensions shown in FIG. 20 are merely exemplary. Other dimensions which vary from those shown and are consistent with other embodiments of the present invention are considered to be within the scope of the present invention.

Referring back to FIG. 1, a cable 44, also known as a "shifter cable," is routed around a pulley 52 and may be attached to the guide arm 34. Alternatively, the cable 44 may be coupled to the pulley 52 and a cable 44 may be attached between the pulley 52 and the guide arm 34 as discussed in more detail below with reference to "bottom pull cable" configurations. The cable 44 is also attached to a shifting device, also known as a "shifter" (not shown) which allows the bicyclist to control the movement of the guide arm 34. A biasing member, shown as a spring 46, has one end attached to the guide arm 34 and the other end attached to the mounting member 12. Thus, the spring 46 acts to bias the guide arm 34 in a downward manner. Other biasing members known to one of ordinary skill in the art may be substituted for the spring 46 in accordance with the present invention. For example and not by way of limitation, FIGS. 22, 23, 26, 29 and 32-34 illustrate two springs 46 in compression for biasing the guide arm 34 in a downward position according to additional embodiments of the present invention.

Still referring to FIG. 1, operation of the front derailleur 10 will now be explained. A bicyclist desiring to engage the bicycle chain 42 with a particular chain ring, e.g., chain ring 26 from chain ring 24, will activate the shifting device, or "shifter" (not shown) accordingly. In activating the shifting device, the cable 44 is either placed in tension thereby exerting a force on the positioning assembly 38 (as in FIG. 1), or relaxed thereby allowing the biasing member 46 to exert a force on the positioning assembly 38, according to alternative embodiments not shown in FIG. 1. If the cable 44 is placed in tension by the shifter, the guide arm 34 is motivated upward, and outward, along the axis of each of the linear guide rods 28 as defined by angles θ and β. The opening 314, 314' of chain guide 236, 236' engages the bicycle chain 42 and urges a corner of the bicycle chain 42 upward and outward from chain ring 24 for engagement with the next larger chain ring 26. The bicycle chain 42 is urged with a lifting motion to a position slightly above the chain ring and then allowed to lower slightly so that it engages with the teeth of the chain ring when fully engaged.

The lifting motion achieved by the front derailleur 10 of the present invention during an up-shift contrasts with the lateral grinding motion associated with conventional front derailleurs. In a conventional front derailleur, the side of the derailleur cage pushes laterally against the side of bicycle chain 42, pushing the chain into the side of the next larger chain ring and pinning the chain against the next larger chain ring until a chain ring tooth can engage the bicycle chain 42 and pull it up onto the following teeth. In contrast, front derailleur 10 lifts a corner of the bicycle chain 42 from behind the next larger chain ring and thereby positions the bicycle chain 42 to engage a chain ring tooth and following teeth. Furthermore, the lifting motion is achieved by contact with a corner 42a of the bicycle chain 42 as viewed in cross-section, see FIG. 20. As shown in FIG. 20, bicycle chain 42 passes through chain guide 236, 236', 1500. During an up-shift, the corner 42a of the bicycle chain 42 is lifted (see arrow 2002). Similarly, during a down-shift, a diametrically opposed corner 42b of the bicycle chain 42 is pulled down until the chain 42 engages the next smaller chain ring.

Referring again to FIG. 20 and in order to further elaborate on the unique shifting performed by the front derailleur 10 of the instant invention, the inside lifting surface 2018 of chain guide 236, 236', 1500 of front derailleur 10 (not shown in FIG. 20) is configured to lift the inside bottom corner 42a of the bicycle chain 42 during an up-shift. The force exerted against the inside bottom corner 42a of the bicycle chain 42 during an up-shift is upward, outward and toward the rear of the bicycle. In contrast, a conventional front derailleur pushes laterally against the inside of the chain 42 until the outside of the chain 42 comes in contact with the next largest chain ring and the next largest chain ring, not the front derailleur cage, actually lifts the chain 42 up onto its teeth during an up-shift. Thus, a conventional front derailleur exerts no force against a bicycle chain "toward the rear" of the bicycle during an up-shift.

Conversely, the outside pulling surface 2016 of chain guide 236, 236', 1500 is configured to pull down on the outside top corner 42b of the bicycle chain 42 and toward the front of the bicycle during a down-shift. Thus, the force exerted against the outside top corner 42b of the bicycle chain 42 during a down-shift is downward, inward and toward the front of the bicycle. Again in contrast, a conventional front derailleur pushes laterally against the side of the bicycle chain 42 until it comes off of the current chain ring and falls down onto the next smaller chain ring during a down-shift. Thus, a conventional front derailleur exerts no "forward" motion against a bicycle chain 42 during a down-shift.

Walls 218, 218' and 2018, as illustrated in FIGS. 6A, 7A, 13A and 20, may each be referred to as an "inside lifting surface." Similarly, walls 216, 216' and 2016, as illustrated in FIGS. 6A-B, 7A-B, 13A and 20, may each be referred to as an "outside pulling surface." The inside lifting surface 218, 218' and 2018 of front derailleur 10 may displaced toward the front of the bicycle relative to the outside pulling surface 216, 216' and 2016. Conversely, the outside pulling surface 216, 216' and 2016 may be displaced towards the rear of a bicycle relative to the inside lifting surface 218, 218' and 2018.

Figure 21:
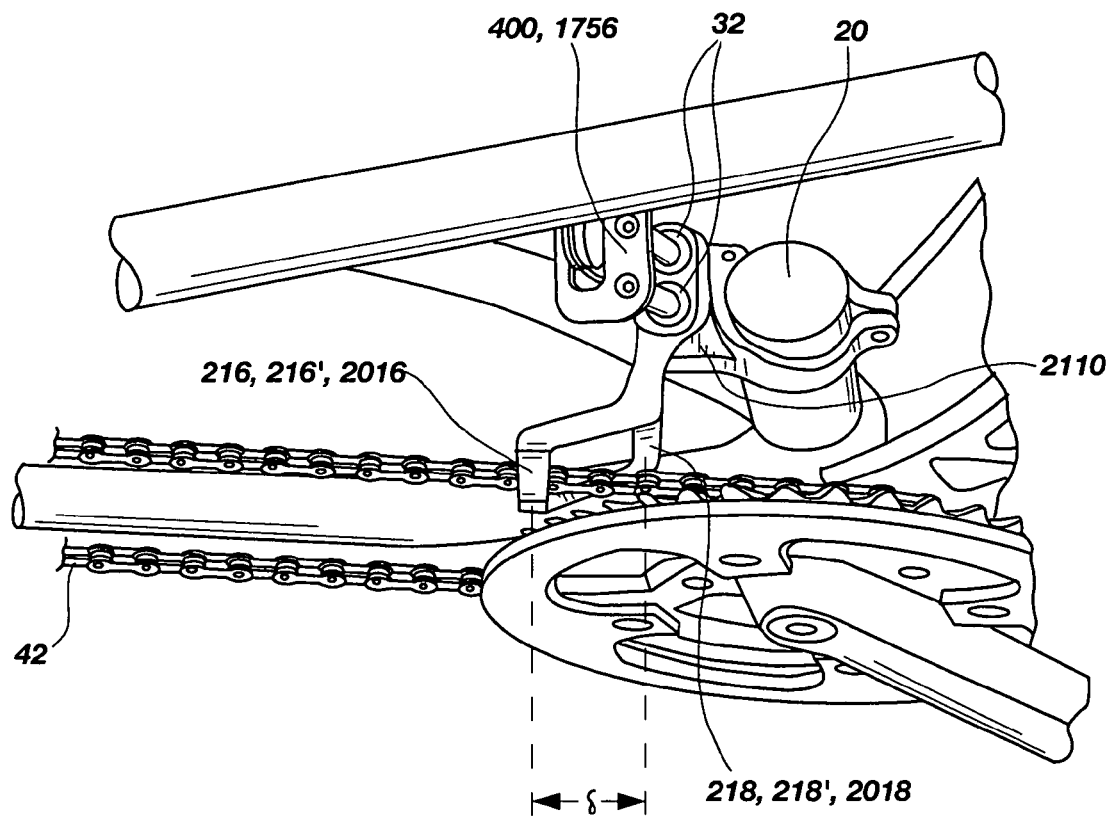
FIG. 21 is a perspective view of yet another front derailleur in accordance with the present invention shown attached to a bicycle frame member.

This displacement, δ, may range from about 0 inches to about 1.2 inches or from about 0 to about 2.5 chain links. This displacement, δ, is illustrated in perspective view in FIG. 21. FIG. 21 is a perspective view of still another embodiment of a front derailleur 2110 in accordance with the present invention. FIG. 21 shows front derailleur 2110 mounted to frame member 20. FIG. 21 also illustrates the outside pulling surface 216, 216' and 2016 may be displaced towards the rear (left in FIG. 21) of a bicycle relative to the inside lifting surface 218, 218' and 2018.

Referring again to FIG. 1, if the cable 44 is relaxed, the spring 46 pulls the guide arm 34 downward, inward and toward the front of the bicycle along each of axis of the linear guide rods 28. Again, the opening 314, 314' of the chain guide 236, 236', engages the bicycle chain 42, thus, motivating the bicycle chain 42 downward, inward and toward the front of the bicycle from one chain ring 24 to the next smaller chain ring 22. Adjustable stops 48 and 50 are attached to the rear mounting member 16 and the structural member 30, respectively. The adjustable stops 48 and 50 serve to limit the downward and upward travel of the guide arm 34. By properly limiting the motion of the guide arm 34, the bicycle chain 42 will also be limited in its range of movement as defined by the distance between largest and the smallest chain rings 26 and 22, respectively. The aperture or opening 314, 314' in the chain guide 236, 236' in combination with the properly defined limits of movement of the guide arm 34, work to prevent improper disengagement or complete derailment of the bicycle chain 42. Once the shift has been completed, i.e., the chain has been shifted from one chain ring to another, the chain guide 236, 236' is positioned so that bicycle chain 42 is centered within and does not rub against chain guide 236, 236'.

A pulley 52 is attached to the structural member 30. The pulley 52 allows for use of a cable 44 that pulls either downward, i.e., a "bottom pull cable 44B", or upward, i.e., a "top pull cable 44B" (see FIG. 14B and related discussion below) and is able to translate the force from either an upward (top) or downward (bottom) pull into the desired motion of the positioning assembly 38. Thus, the front derailleur 10 of the present invention is easily adapted to bicycles having either top pull or bottom pull configurations. Pulley 52 may be selectively sized to accommodate a particular make or configuration of shifter.

Figure 14A:
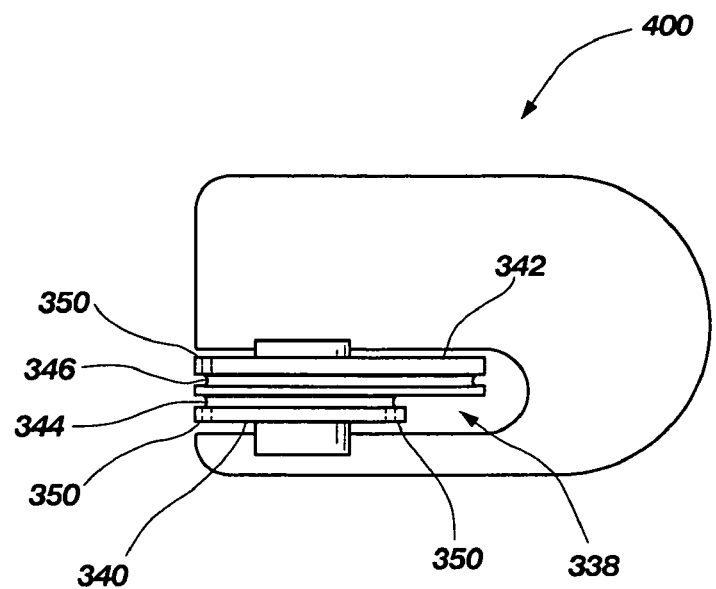
FIGS. 14A and 14B are views of a pulley member used in accordance with certain aspects of the present invention.
Figure 14B:
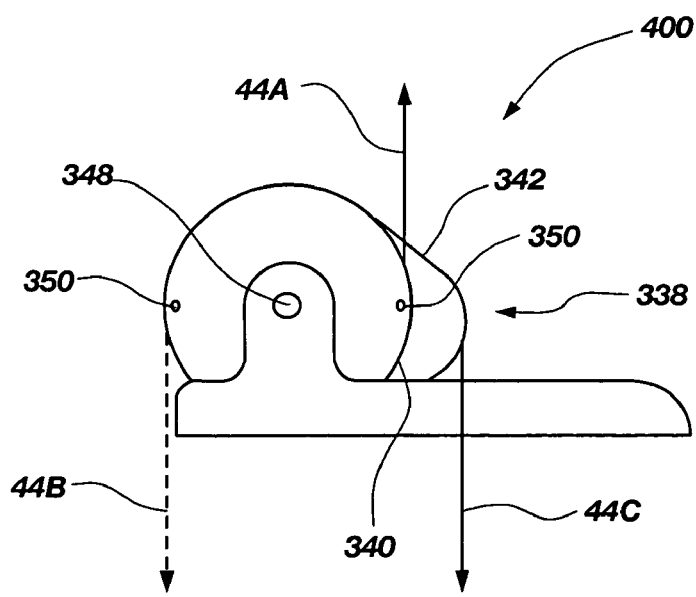

Referring to FIGS. 14A and 14B, a pulley housing 400 in accordance with an embodiment of the present invention is shown. The pulley housing 400 mates with the distal ends, i.e., the ends furthest away from mounting member 12, of linear guide rods 28 (not shown in FIGS. 14A and 14B). The pulley housing 400 may include a cam member 338 having a circular portion 340 and a cam portion 342. Alternatively, pulley housing 400 may include a single pulley (not shown) appropriately sized for the shifter used with front derailleur 10. The circular portion 340 may include a groove 344 formed circumferentially thereabout configured to receive a top pull cable 44A or a bottom pull cable 44B, therein. Integral with the circular portion 340 or alternatively mechanically coupled therewith, is the cam portion 342 which may also include a groove 346 formed circumferentially thereabout to receive the guide arm cable 44C, therein. Guide arm cable 44C may be secured at a first end to cam portion 342 using one or more set screws 350 and at a second end to guide arm 34. Similarly, one or more set screws 350 may be used to anchor a first end of the top pull cable 44A or the bottom pull cable 44B within groove 344 of circular portion 340. The other end of the top pull cable 44A or the bottom pull cable 44B would be secured to the shifter (not shown) through cable guides (not shown) and/or cable housing (not shown) as known to one of ordinary skill in the art.

Compatibility with existing bicycle components may be an important feature for both the manufacturer and the consumer of the inventive front derailleur 10. While it is not necessary for front derailleur 10 to include a pulley housing 400 with a cam member 338, it may be advantageous for applications where different shifters require different shifter cable displacement. By selectively sizing the circular portion 340 and the cam portion 342 virtually any make of shifters may be accommodated with a single front derailleur 10 including a cam member 338. Cam member 338 may be serviceable and replaceable. Cam member 338 may also be optimally sized for a particular make of shifter. Various cam shapes may be used to accommodate the necessary displacement of guide arm 34 in accordance with the present invention.

The interchangeability feature of the cam member 338 enables this embodiment of a front derailleur 10 to be used with various shifters. Because different shifters are calibrated to displace the top pull cable 44A (or bottom pull cable 44B) at differing magnitudes, it is desirable to provide a simple means of calibrating the front derailleur 10 to the specific shifter being used. Thus, by configuring the particular shape of the cam portion 342 and the diameter of the circular portion 340 the movement of the positioning assembly 38 (FIG. 1) may be calibrated with a specific shifter. By determining the type of shifter being used and its displacement of the top pull cable 44A (or bottom pull cable 44B), a properly configured cam member 338 may be selected and installed into the front derailleur 10. While other methods of calibration may be used, the use of such a cam member 338 allows for a simple and inexpensive technique which does not require disassembly and alteration of the actual shifter with which the derailleur is coupled.

Front derailleur 10 may be packaged with multiple cam members 338 each sized for a particular brand of shifter. Alternatively, cam member 338 may be packaged and sold separately as an optional or replacement component of front derailleur 10. The sizing and selection of the shape of cam member 338 is within the ability of one of ordinary skill in the art and, thus, will not be further elaborated herein.

In the above-described configuration of pulley housing 400, two cables are required to operate front derailleur 10: (1) a guide arm cable 44C and (2) a top pull cable 44A or bottom pull cable 44B. Yet another embodiment of a pulley housing 400 (not shown) may include a single pulley and groove for receiving a single cable 44. This embodiment of a pulley housing 400 (not shown) would include securing one end of cable 44 at the shifter, routing cable 44 through cable guides (not shown) and/or cable housing (not shown) and securing the other end of cable 44 at guide arm 34. This embodiment of a pulley housing 400 (not shown) may be configured as necessary to accommodate a top or bottom pull cable configuration as known to one of ordinary skill in the art. Advantages of this configuration of pulley housing 400 (not shown) may include weight savings and simplicity of using a single cable 44.

Upon actuation of either the top pull cable 44A or the bottom pull cable 44B, both the circular portion 340 and the cam portion are caused to rotate about their common axis 348. However, the rotation of the cam portion 342 causes an amplified displacement of guide arm cable 44C relative to that of the top pull cable 44A or bottom pull cable 44B. Thus, a relatively small movement of the top pull cable 44A or bottom pull cable 44B may result in a relatively large movement of the bottom pull cable 44B and the positioning assembly 38 to which it is attached (FIG. 1). Of course, one of ordinary skill in the art could devise other pulley-based mechanisms consistent with the present invention to effectuate the desired movement of guide arm 34. Such other mechanisms are considered within the scope of the present invention.

Figure 7A:
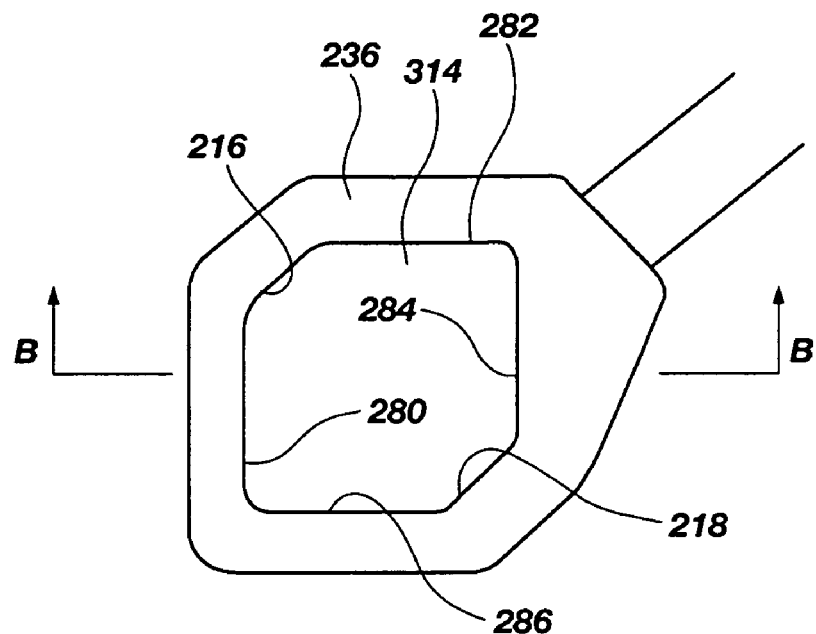
FIGS. 7A and 7B are views of an alternative embodiment of a chain guide according to the present invention and suitable for use with the front derailleur shown in FIGS. 1 through 3.
Figure 7B:
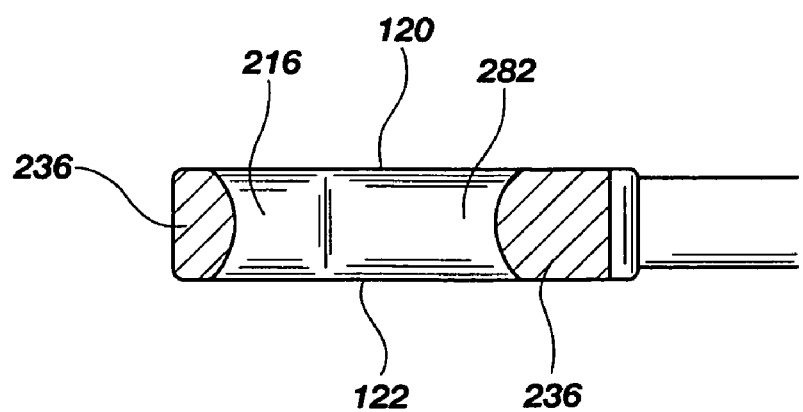

It is noted that various modifications may be made to the present invention without departing from the spirit or scope of the invention. For example, alternative mechanisms could be utilized to induce the motion of the guide arm 34. In another embodiment, hydraulics may be employed to control the motion of the guide arm 34 in place of the cable 44. Yet another embodiment includes a chain guide 236, 236' constructed of a single material, without an insert 238, as shown in FIGS. 7A and 7B. The shape and functioning of the chain guide 236, 236' is the same as the chain guide depicted in FIGS. 6A and 6B; however, because the surface of the guide contacting the chain is a harder material, e.g., metal, the wear to the chain will be increased, while the wear to the chain guide may be reduced. Yet another embodiment may include a second mounting member coupled between structural member 30 and the seat tube or other bicycle frame member to stabilize the one or more linear guide rods 28 when the bicycle chain 42 is being shifted. Furthermore, various combinations of alternative elements as discussed are within the scope and spirit of the present invention.

Figure 4:
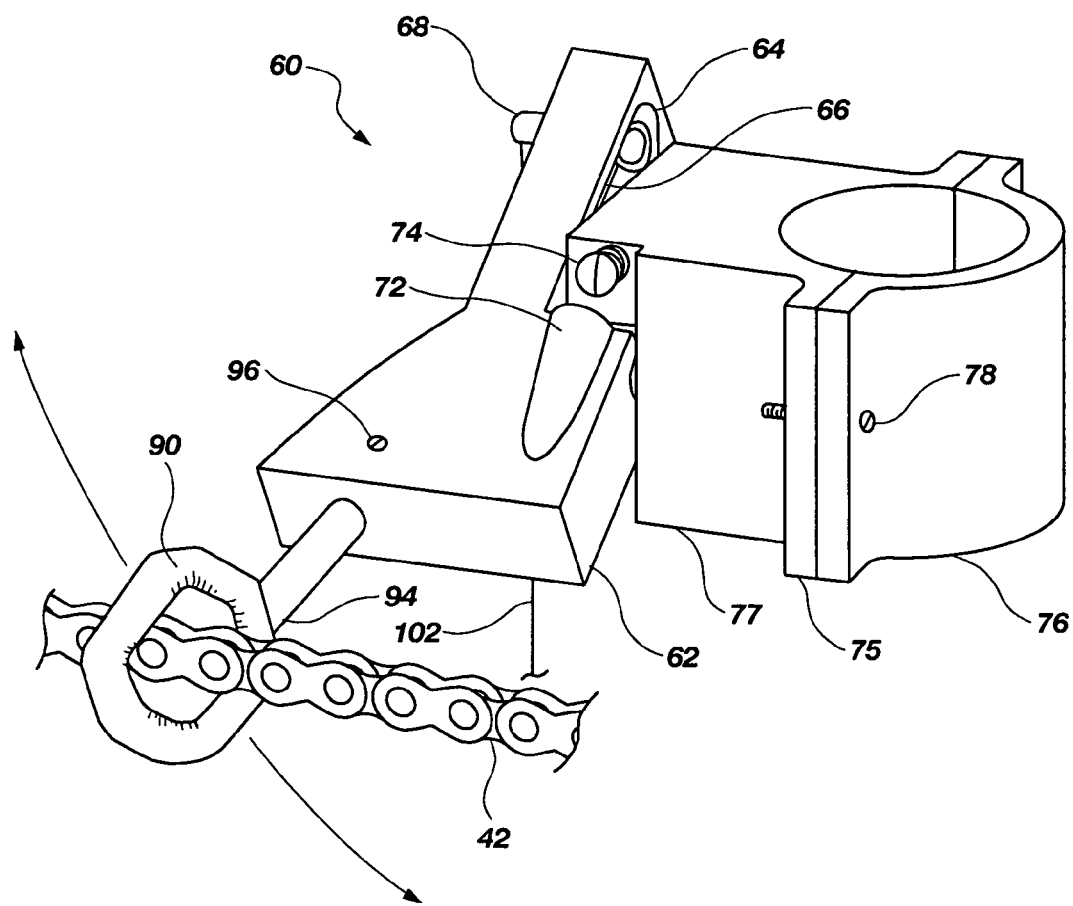
FIG. 4 is a perspective view of an alternative embodiment of the present invention.
Figure 5:
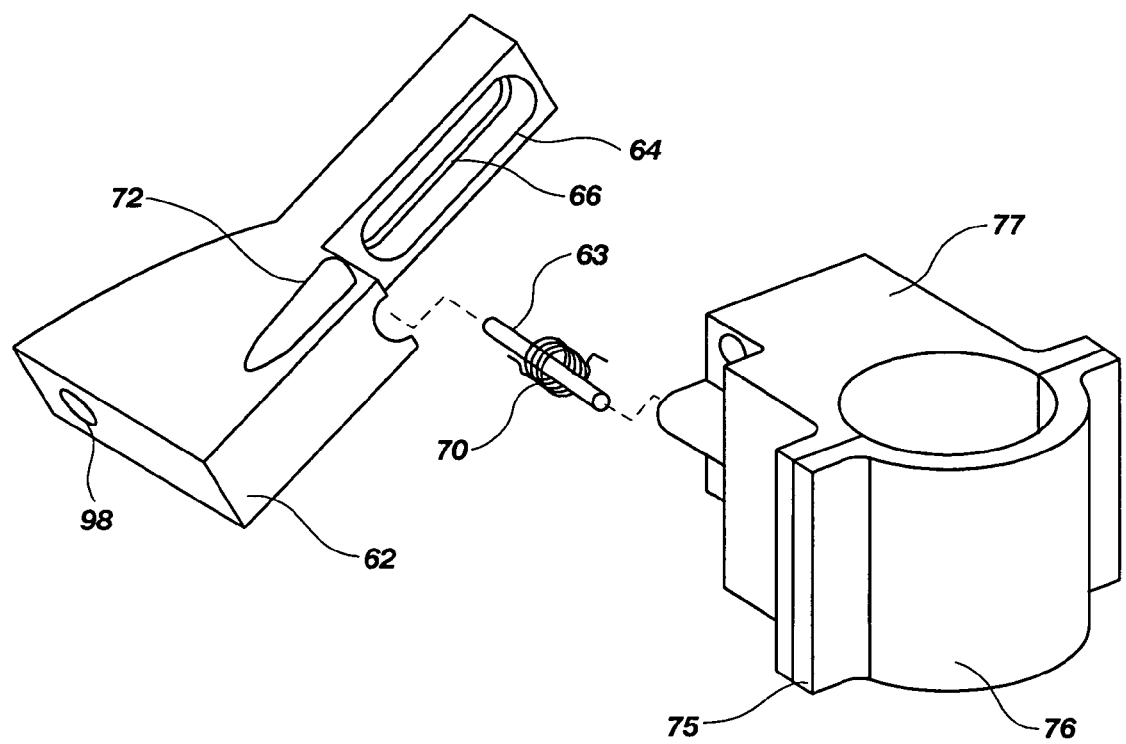
FIG. 5 is an exploded view of elements of the embodiment of FIG. 4.

Referring now to FIGS. 4 and 5, another embodiment of a front derailleur 60 according to this invention is disclosed. A mounting member 75 is fastened to a bicycle frame member such as a seat tube (not shown). The mounting member 75 is a split clamp which allows for installation on numerous bicycle frames. The mounting member 75 is shown as being a two piece clamping mechanism wherein fasteners 78 provide the clamping action between a front mounting member 76 and a rear mounting member 77. Front and rear mounting members 76 and 77 may also be hinged together to form a mounting member 75 with a hinged clamping mechanism, see FIG. 10 and related discussion below. Fasteners 78 may be screws, cam locks, rivets or other means for securing members 76 and 77. It is contemplated that mounting member may alternatively be a bracket for fastening to a braze-on mount on a seat tube of the bicycle frame, or a bracket for fastening to another member of the bicycle frame, see FIG. 11 and related discussion below.

A pivot arm 62 may be pivotally connected to the rear bracket member 77 by means of a bearing pin 63 or other suitable means. A coil spring 70 is housed between the rear mounting member 77 and the pivot arm 62 concentric with the bearing pin 63 to provide a torsional bias to pivot arm 62. Chain guide 90 is connected to a stem 94 which is inserted into a bore 98 in the pivot arm 62. The stem 94 is keyed to the bore and is axially adjustable within the bore. A set screw 96 secures the position of the stem 94. Two embodiments of chain guide 90, 900 are shown in detail in FIGS. 8A, 8B, 9A and 9B. A bicycle chain 42 is received through the opening 114 of the insert 92, or alternatively through the opening 114 of the chain guide 900 if an insert 92 is not being utilized.

Referring again to FIGS. 4 and 5, a slot 64 is provided in the back side of the pivot arm 62. The slot 64 has a shouldered surface 66 allowing the head of a fastener 68 to be seated thereon. The fastener 68 allows for attachment of a cable 102. A stop 72 is shown on the top side of the pivot arm. The stop 72 interacts with an adjustment screw 74, which is threaded in the rear mounting member 77. The stop 72 and the adjustment screw 74 work together to define a rotational limit of the pivot arm 62. A similar stop and adjustment screw (not shown) are found on the bottom side of the derailleur 60 to limit rotational movement of the pivot arm 62 in the opposite direction.

The front derailleur 60 is operated by a bicyclist activating a shifting mechanism, or shifter, (not shown) which in turn causes the cable 102 to either pull down on the back portion of the pivot arm 62, or to relax the tension on the cable 102. When the cable 102 is relaxed, the coil spring 70 acts torsionally to rotate the front portion of the pivot arm downward until the pivot arm 62 has reached its limit of rotation. Thus, the movement of the pivot arm 62 controls the position of the chain guide 90. The chain guide 90 travels in an arcuate path urging the bicycle chain 42 upward and outward, to the next largest chain ring (not shown in FIG. 4 or FIG. 5), or downward and inward to the next smallest chain ring.

Figure 8A:
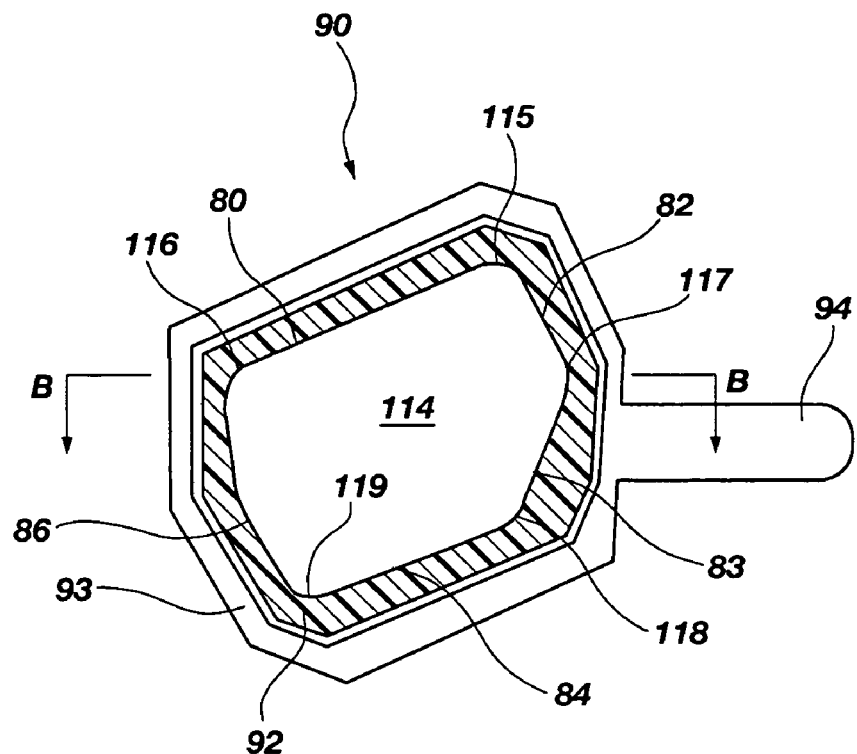
FIGS. 8A and 8B are views of a chain guide according to the present invention and suitable for use in the front derailleur shown in FIGS. 4 and 5.
Figure 8B:
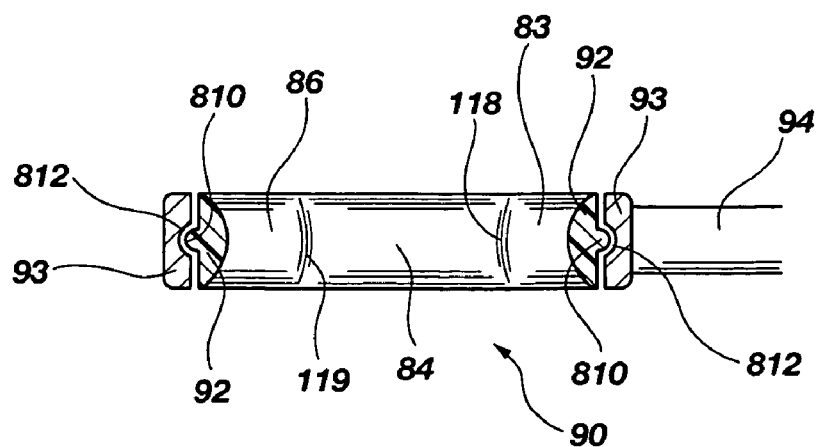

FIGS. 8A and 8B depict another embodiment of a chain guide 90 configured for use with the front derailleur 60 shown in FIGS. 4 and 5. Chain guide 90 differs from the chain guide 236, 236' used with the embodiment of the invention in FIGS. 1 through 3 in that the shape of opening 114 has been modified so that the side of the opening 114 contacting the chain is oriented appropriately throughout the movement of the chain guide. In general, the chain is urged downward and inward by upper wall 80 of opening 114 and upward and outward by lower wall 84 and lower-inner wall 83 of opening 114. It will be appreciated that, because the chain guide moves in an arc rather than in a linear pattern, the side of the opening 114 contacting the chain varies as the chain guide is moved. Thus, when the chain guide is near the bottom of its arc (near the smallest chain ring) the chain will be urged upward by lower wall 84, and will contact lower wall 84 in the region closer to corner 119.

Figure 9A:
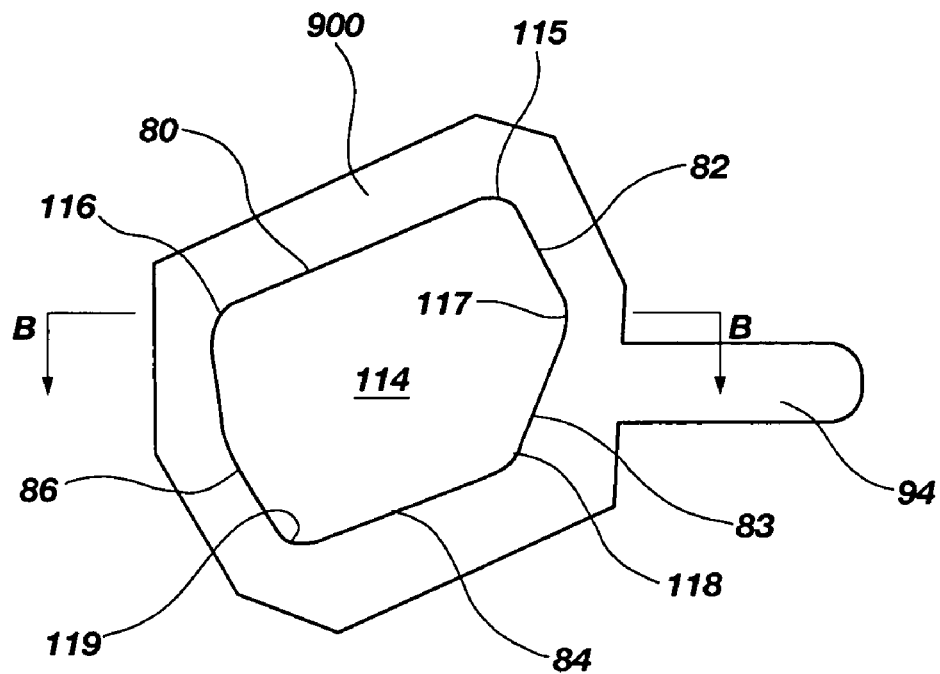
FIGS. 9A and 9B are views of an alternative embodiment of a chain guide according to the present invention and suitable for use in the front derailleur shown in FIGS. 4 and 5.
Figure 9B:
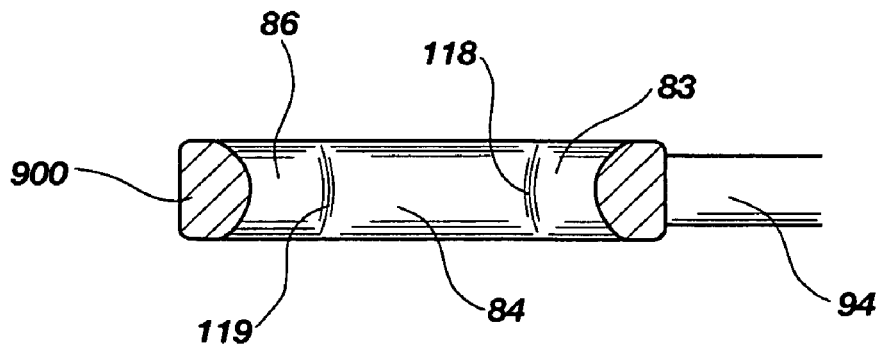

As the chain guide is moved upward and outward, in the arcuate path indicated in FIG. 4, the chain will move along lower wall 84 until it reaches corner 118, and then move onto lower-inner wall 83, until at the top of its arc, it will contact lower-inner wall 83 closer to corner 117. When the chain is to be moved downward, at the highest part of the arc chain 42 will contact upper wall 80 closer to corner 116. As the chain guide is moved downward and inward, the chain will move toward corner 115 along upper wall 80. The embodiment of the chain guide 90 shown in FIGS. 8A and 8B may include an insert 92 which is secured to outer rim 93 by means of a lip 810 on insert 92 which fits into groove 812 formed in outer rim 93. The chain guide 900 shown in FIGS. 9A and 9B is similar in shape to the chain guide 90 of FIGS. 8A and 8B, but is constructed of a single material and does not include an insert 92.

Again, modifications to the disclosed embodiment are contemplated as being within the scope and spirit of the invention. For example, various shapes and configurations of the chain guide 90 and insert 92 may be employed in the instant embodiment. Likewise, alternative embodiments are contemplated wherein the stem 94 is coupled to the swing arm 62 in a different manner, such as by welding or another type of bonding. The stem 94 could also be eliminated altogether to create an integral unit of the chain guide 90 and the swing arm 62. Furthermore, the components of the derailleur 60 as just described may be made from various materials such as stainless steel, aluminum, titanium, or composite materials depending on the desired corrosion and wear resistance, as well as the desired strength to weight ratio.

Figure 32:
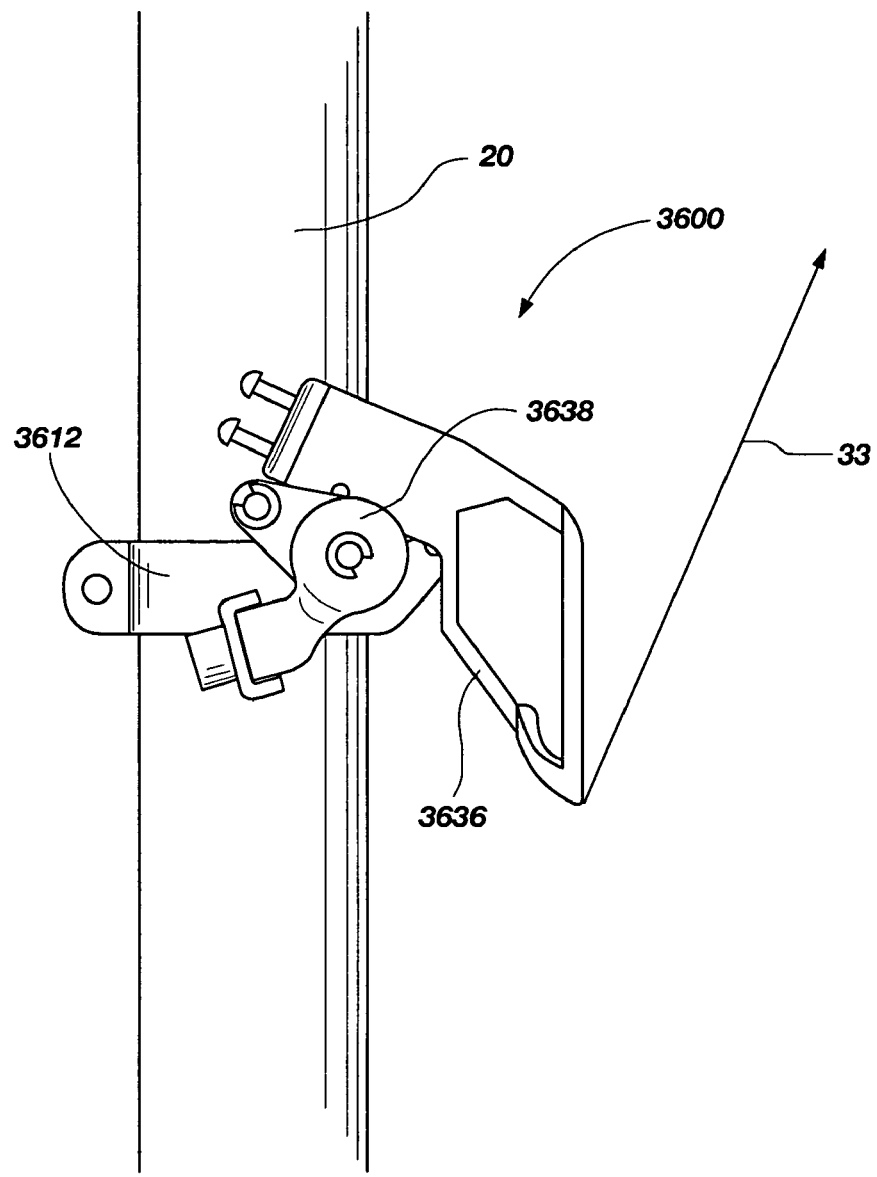
FIG. 32 is an illustration of a rear view of yet another embodiment of a front derailleur according to the present invention.

FIG. 32 is an illustration of a rear view of yet another embodiment of a front derailleur 3600 according to the present invention. Front derailleur 3600 may include a four pin linkage 3638 embodiment of a positioning assembly 38. Front derailleur 3600 may further include a mounting member 3612 configured for attachment to a structural member such as seat tube 20. The four pin linkage 3638 is configured to move chain guide 3636 along chain guide path 33 as described herein. The operation of such a four pin linkage 3638 may be similar to conventional front derailleurs, e.g., the four pin linkage mechanism as described in U.S. Pat. No. 4,743,083 to Nagano, but with the unique chain guide 3636 (or any other embodiment of a chain guide as described herein) and configured for movement along the unique chain guide path 33. As the operation of conventional four-pin linkage mechanisms are known to those skilled in the art, no further discussion regarding same is provided herein.

FIG. 10 is a perspective view of a front derailleur 1000 in accordance with the present invention including a hinged mounting mechanism 1002. Hinged mounting mechanism may included hinged clamps 1004 secured by a screw 1006. Front derailleur 1000 may include guide arm 1034 with integrated chain guide 236, 236', 1500 and biased by spring 46. Front derailleur 1000 may also include a pulley housing 400 coupled to guide arm 1034 by a cable 44 for positioning the guide arm 1034 over linear guide rods 28 in response to a cable 44. Cable 44 may be a top pull cable 44A or bottom pull cable 44B as described with reference to FIG. 14B, herein.

FIG. 11 is a perspective view of a front derailleur 1100 in accordance with the present invention. Front derailleur 1100 is similar to front derailleur 1000 except for the braze-on mounting mechanism 1102. Braze-on mounting mechanism 1102 may include a bracket for mechanically coupling to a braze-on that is permanently affixed to the seat tube or its equivalent bicycle frame structural member.

FIG. 12 is a perspective view of a front derailleur 1200 in accordance with the present invention. Front derailleur 1200 is similar to front derailleur 1000 except for the bottom bracket mounting mechanism 1202. Bottom bracket mounting mechanism 1202 may be configured for attaching front derailleur 1200 to a bottom bracket (not shown) with lock rings or the like.

Figure 16A:
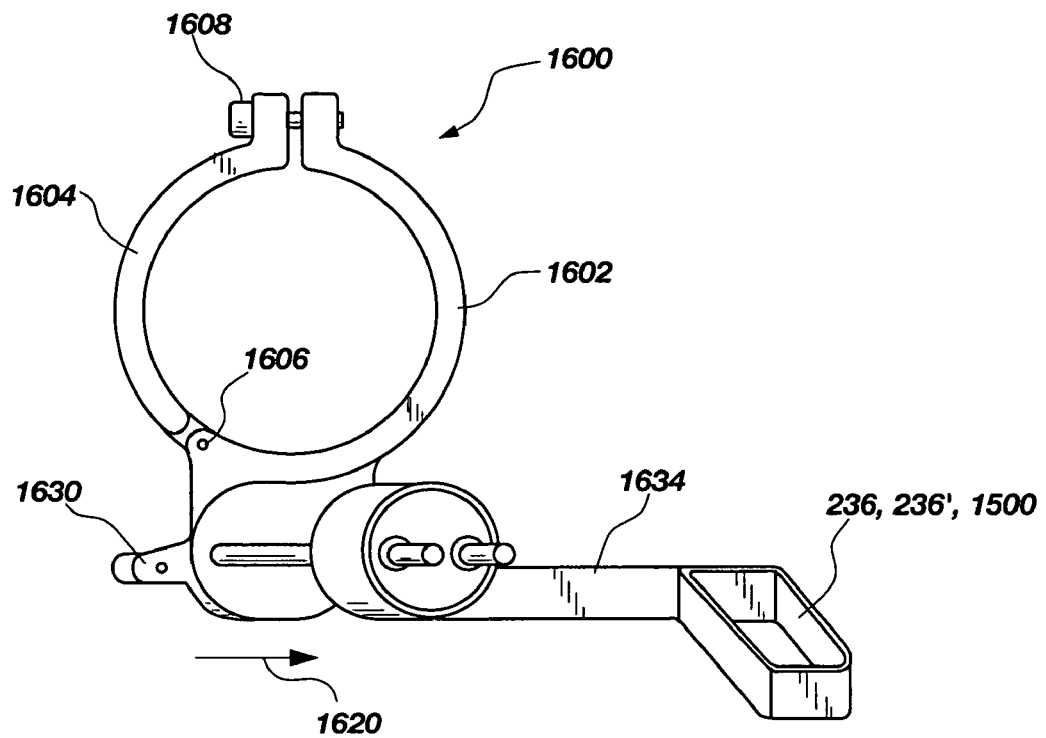
FIGS. 16A and 16B are top views of yet another embodiment of a front derailleur in accordance with the present invention.
Figure 16B:
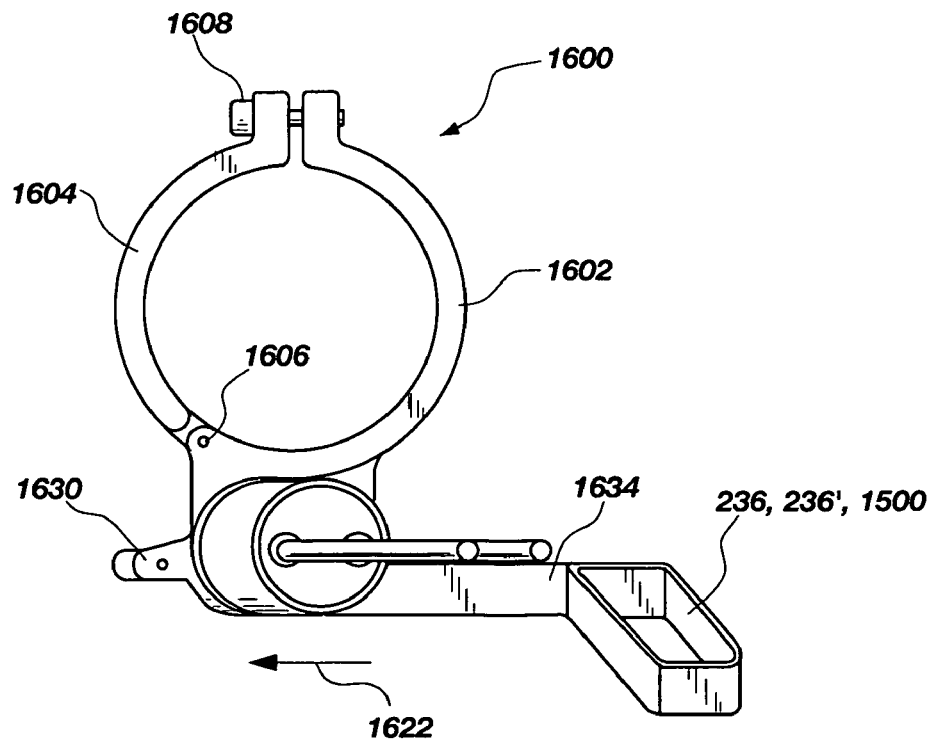

FIGS. 16A and 16B are top views of yet another embodiment of a front derailleur 1600 in accordance with the present invention. Both FIGS. 16A and 16B illustrate front derailleur 1600 from a view concentrically downward from a seat tube (or equivalent bicycle frame structural member) without pulley housing 400. Front derailleur 1600 may include guide arm 1634 with integrated chain guide 236, 236', 1500, bottom pull cable receiver 1630 and mounting member 1602. Mounting member may include a hinged arm 1604 rotationally coupled at one end by a hinge pivot 1606 and configured to receive a mounting screw 1608 at the opposite end. With the mounting screw 1608 removed, the hinged arm 1604 may be opened to allow placement of the mounting member 1602 around a seat tube. The mounting screw 1608, or other suitable fastener, allows the front derailleur 1600 to be secured to the seat tube in a fixed position. FIG. 16A also illustrates guide arm 1634 in a fully extended position (see arrow 1620). Similarly, FIG. 16B illustrates guide arm 1634 in a fully retracted position (see arrow 1622).

Figure 17:
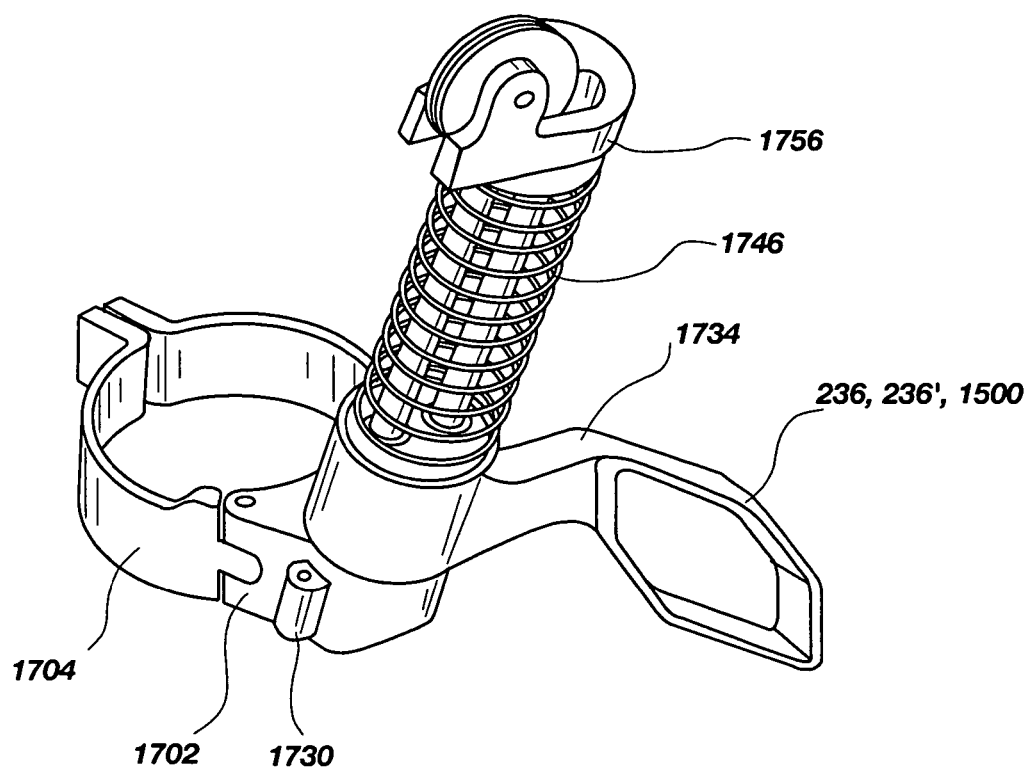
FIG. 17 is a perspective view of another embodiment of a front derailleur according to the present invention.

FIG. 17 is a perspective view of another embodiment of a front derailleur 1700 according to the present invention. Front derailleur 1700 may include guide arm 1734 with integrated chain guide 236, 236', 1500, pulley housing 1756, bottom pull cable receiver 1730 and mounting member 1702. Bottom pull cable receiver 1730 receives bottom pull cable 44B (not shown in FIG. 17) and, optionally, a cable housing (also not shown). Front derailleur 1700 may also include a coil spring 1746 for biasing the guide arm 1734.

Figure 18:
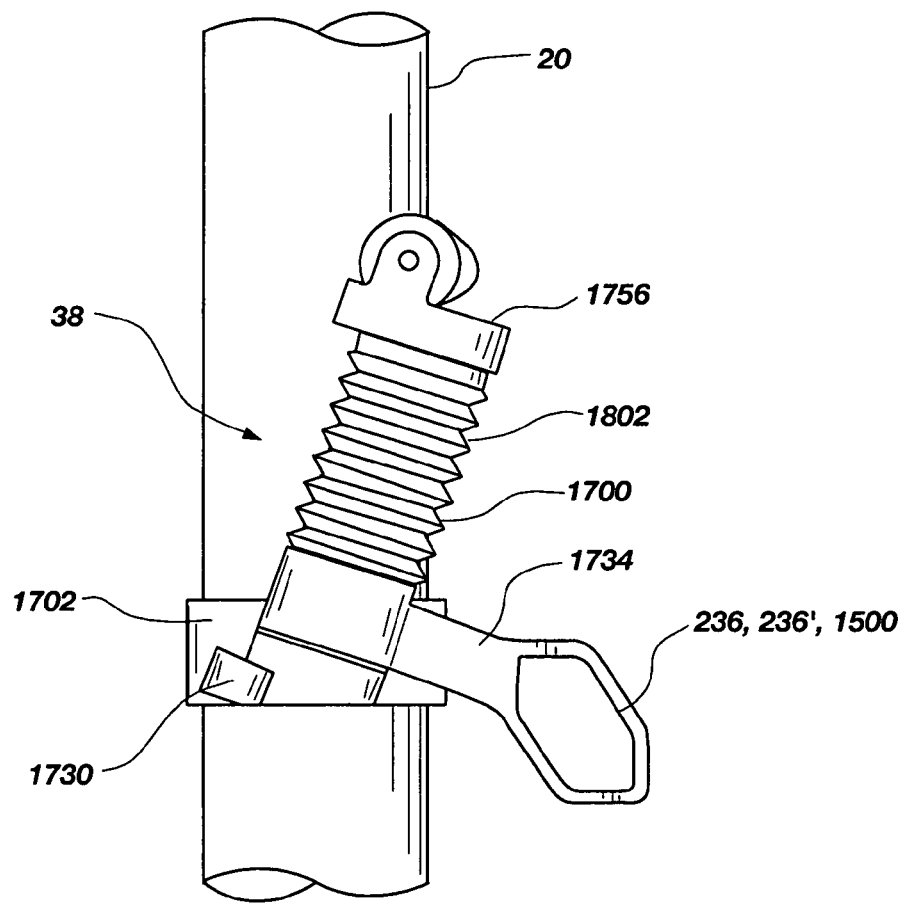
FIG. 18 is a side perspective view of the front derailleur illustrated in FIG. 17.

FIG. 18 is a side perspective view of the front derailleur 1700 illustrated in FIG. 17, showing a boot 1802 over coil spring(s) 1746 (not visible in FIG. 18). Boot 1802 may be formed of any suitable rubber, plastic or elastically deformable material. The purpose of boot 1802 is to surround and protect linear guide rods 28 (hidden from view in FIG. 18), linear bearings 32 (also hidden from view in FIG. 18) and coil spring(s) 1746 (also hidden from view in FIG. 18) from dirt, sand, water and other environmental elements. FIG. 18 also illustrates front derailleur 1700 mounted on a seat tube 20 using mounting member 1702. FIG. 18 is also illustrative of an embodiment of a positioning assembly 38, namely of the hydraulic actuator variety (hidden from view under boot 1802) according to the present invention. Boot 1802 may be used in conjunction such a hydraulic actuator to protect surfaces of the hydraulic actuator from dirt, water and other contaminants.

An embodiment of a front derailleur according to the present invention is disclosed. The embodiment of a front derailleur may include a mounting member configured for attachment to a structural member of a bicycle frame. The embodiment of a front derailleur may further include a chain guide comprising an aperture the periphery of which, when viewed along the direction of bicycle chain travel, forms a simple convex polygon. The embodiment of a front derailleur may further include a positioning assembly configured for attachment to the mounting member and the chain guide, wherein the positioning assembly moves the chain guide in a linear path to the rear and right side of the bicycle frame to which the front derailleur is mounted during an up-shift.

The embodiment of the front derailleur according to the present invention may further be characterized by its unique location of the chain guide during shifting. The chain guide is at all times behind the bottom bracket or other structural member to which the mounting member is configured for attachment relative to a front end of the bicycle frame. In contrast, all conventional front derailleurs have a chain guide that overlaps the seat tube in projection. This is because most conventional front derailleurs have long crescent-shaped chain guides or cages that move in a plane perpendicularly away from the right side of the bicycle.

In an embodiment of a front derailleur according to the present invention, movement of the chain guide during shifting does not lie in a plane perpendicular to any plane coincident with the chain rings. As mentioned above, conventional front derailleurs move the chain guide or cage in a direction that is perpendicular to any of the chain rings of a crankset, regardless of whether a triple or double chain ring crankset is being used.

An embodiment of a front derailleur according to the present invention may further be characterized as having a movement of the chain guide during shifting that lies in a plane passing through a centerline of the chain guide path 33 at an angle, $\beta$, as measured from a horizontal axis. The centerline of the chain guide path 33 may be the axis of a linear guide rod, or alternatively, the axis of a hydraulic cylinder (alternative embodiment, not shown in the FIGS. for a positioning assembly 38) or any other suitable reference for establishing the linear chain guide path depending on the particular embodiment of the present invention. Thus, the angle of the chain guide path according to the embodiments of a front derailleur of the present invention may be quantified as an angle, $\beta$, measured in units of degrees. $\beta$ may be measured as the angle between a horizontal axis parallel to any plane in which the chain rings lie and a plane perpendicular to any plane in which a chain ring lies that passes through the chain guide path, see FIG. 2. The horizontal axis may be obtained by drawing an imaginary line through the center point of each axle of the bicycle wheels, or alternatively, through the center of the front and rear dropouts on the bicycle fork and frame, respectively. Note that the horizontal axis 35 may be displaced vertically without changing the angle, $\beta$, so that it may pass through the center of the crankset axle or bottom bracket as shown in FIG. 2. Note also that the horizontal axis 35 must be parallel to an imaginary plane dividing the bicycle frame into right and left sides. The angle of rearward movement, $\beta$, may alternatively be calculated by measuring the angle, $\omega$, also measured in units of degrees, starting from a vertical axis 37 that is perpendicular the aforementioned horizontal axis 35 and ending on the centerline of the chain guide path 33, see FIG. 2. Note further that $\beta+\omega=90°$. The angle, $\beta$, may lie within a range from about 65° to about 69° according to embodiments of the present invention. In a presently preferred embodiment, $\beta$ is about 67°.

According to embodiments of the front derailleur of the present invention, full movement of the chain guide may extend over a linear distance exceeding about 2.5 centimeters for a crankset having three chain rings. According to other embodiments of the front derailleur of the present invention, full movement of the chain guide may extend over a linear distance exceeding about 1.5 centimeters for a crankset having two chain rings.

Unlike conventional front derailleurs, the embodiments of front derailleurs according to the present invention include a chain guide configured to vertically lift up on the bicycle chain during an up-shift even without the presence and motion of the next biggest chain ring. Stated another way, if a conventional front derailleur were used to up-shift a chain without the crankset installed, it would merely push the bicycle chain laterally away from the bicycle frame and would not exert an upward vertical force on the bicycle chain. Similarly, the embodiments of front derailleurs according to the present invention include a chain guide configured to vertically pull down on the bicycle chain during a down-shift. Conversely, conventional front derailleurs merely pull laterally inward until the bicycle chain falls off the chain ring to the next smallest chain ring during a down-shift.

Embodiments of the front derailleur according to the present invention may include a positioning assembly having two linear guide rods. This is a particularly distinctive feature of the present invention. The inventor is not aware of any conventional front derailleur employing two linear guide rods to position the novel chain guide. Other embodiments of the front derailleur according to the present invention may include a positioning assembly including a hydraulic cylinder or actuator.

Yet another embodiment of the front derailleur according to the present invention may include a positioning assembly that is laterally adjustable relative to the mounting member. The lateral adjustment may be achieved by a slot in the mounting member that mates with the positioning assembly and is secured by a mounting screw. Of course, other suitable means of providing lateral adjustment to the positioning assembly will be readily apparent to one of skill in the art and are considered to be within the scope of the present invention.

Still another embodiment of the front derailleur according to the present invention may include a positioning assembly including an end cap for receiving linear guide rods. The end cap on such an embodiment of a front derailleur may further include a guide for guiding a shifter cable. The end cap may further include a threaded hole configured for receiving a derailleur stop adjustment screw according to yet another embodiment of the present invention.

An embodiment of a chain guide for a front derailleur according to the present invention is also disclosed. The embodiment of a chain guide may include an inside lifting surface configured for lifting up vertically on a corner of a bicycle chain as viewed in cross-section during an up-shift. The embodiment of a chain guide may further include an outside pulling surface configured for pulling down vertically on an opposite corner of the bicycle chain as viewed in cross-section during a down-shift. These features are believed to be unique to the present invention.

Embodiments of a chain guide for a front derailleur according to the present invention may further include an aperture having an outline configured as a simple convex polygon when viewed in the direction of bicycle chain travel. The inside lifting surface and the outside pulling surface of a chain guide according to embodiments of the present invention may form sides of the simple convex polygon. Embodiments of the chain guide according to the present invention may be configured for positioning by linear guide rods. Other embodiments of the chain guide according to the present invention may be configured for positioning by a hydraulic actuator. Additionally, embodiments of the chain guide according to the present invention may be formed from stainless steel.

Figure 22:
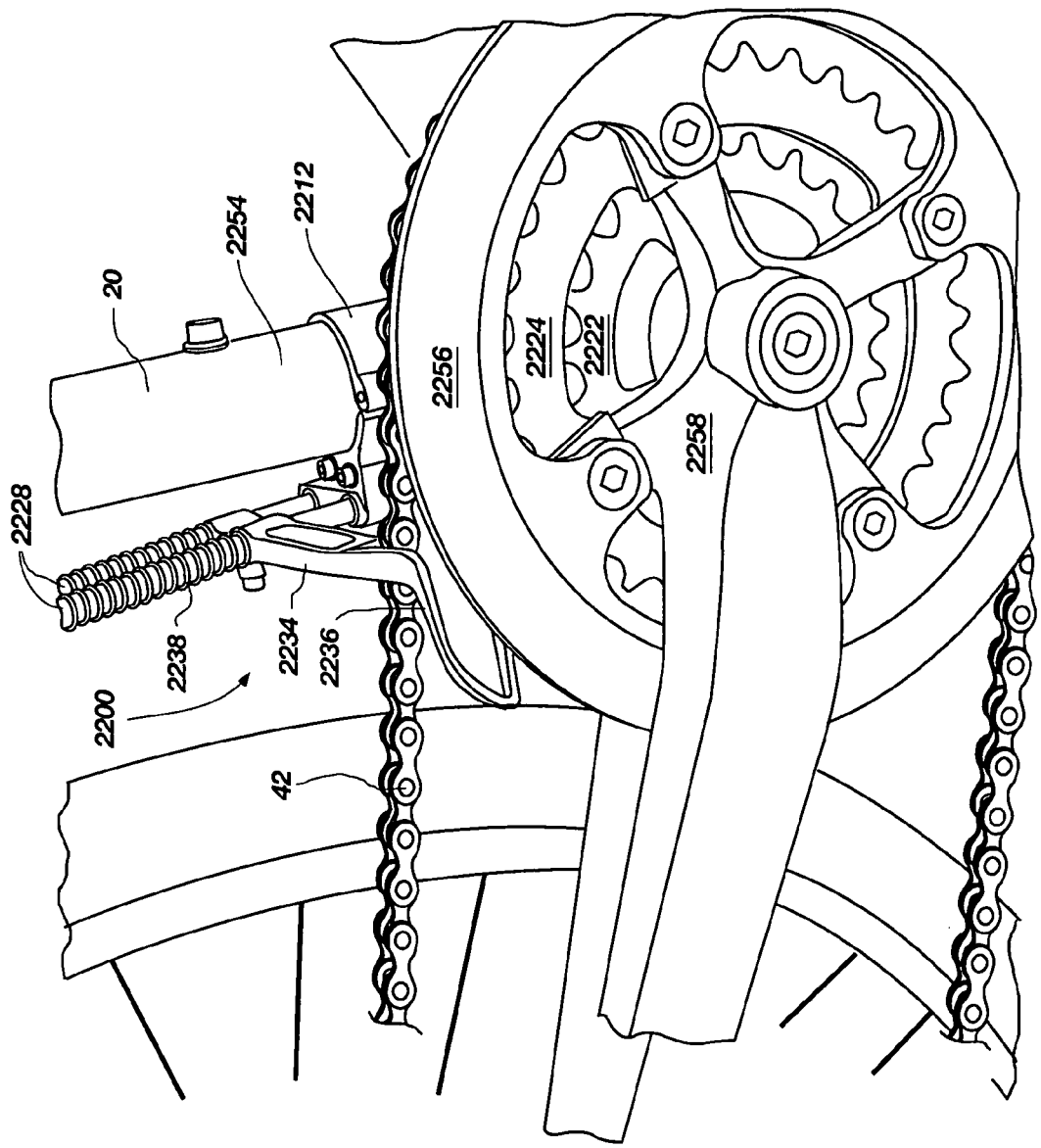
FIG. 22 is a drawing of a right-side perspective view of still another embodiment of a front derailleur in accordance with the present invention shown installed on a mountain bike.

FIG. 22 is a drawing of a right-side perspective view of still another embodiment of a front derailleur 2200 in accordance with the present invention shown installed on a mountain bike (only a portion shown). Note that the guide arm 2234, chain guide 2236 and positioning assembly 2238 are all outside of the bicycle frame 2254 main triangle, i.e., it is located behind the seat tube 20. Front derailleur 2200 is attached to a bicycle frame 2254 at seat tube or other structural member 20 using mounting member 2212 which clamps around the seat tube or other structural member 20. FIG. 22 further illustrates a guide arm 2234 and its integral chain guide 2236. The chain guide 2236 surrounds and controls the positioning of chain 42 on the chain rings 2222 (smallest), 2224 (middle) and 2226 (largest not shown in FIG. 22), especially during shifting. In FIG. 22, the largest chain ring 2226 is hidden behind chain ring protector 2256, but middle chain ring 2224 and smallest chain ring 2222 are shown mounted on a crankarm spider 2258. FIG. 22 also shows positioning assembly 2238 with two linear guide rods 2228 upon which the guide arm 2234 and integral chain guide 2236 are moved during shifting of the chain 42.

Figure 23:
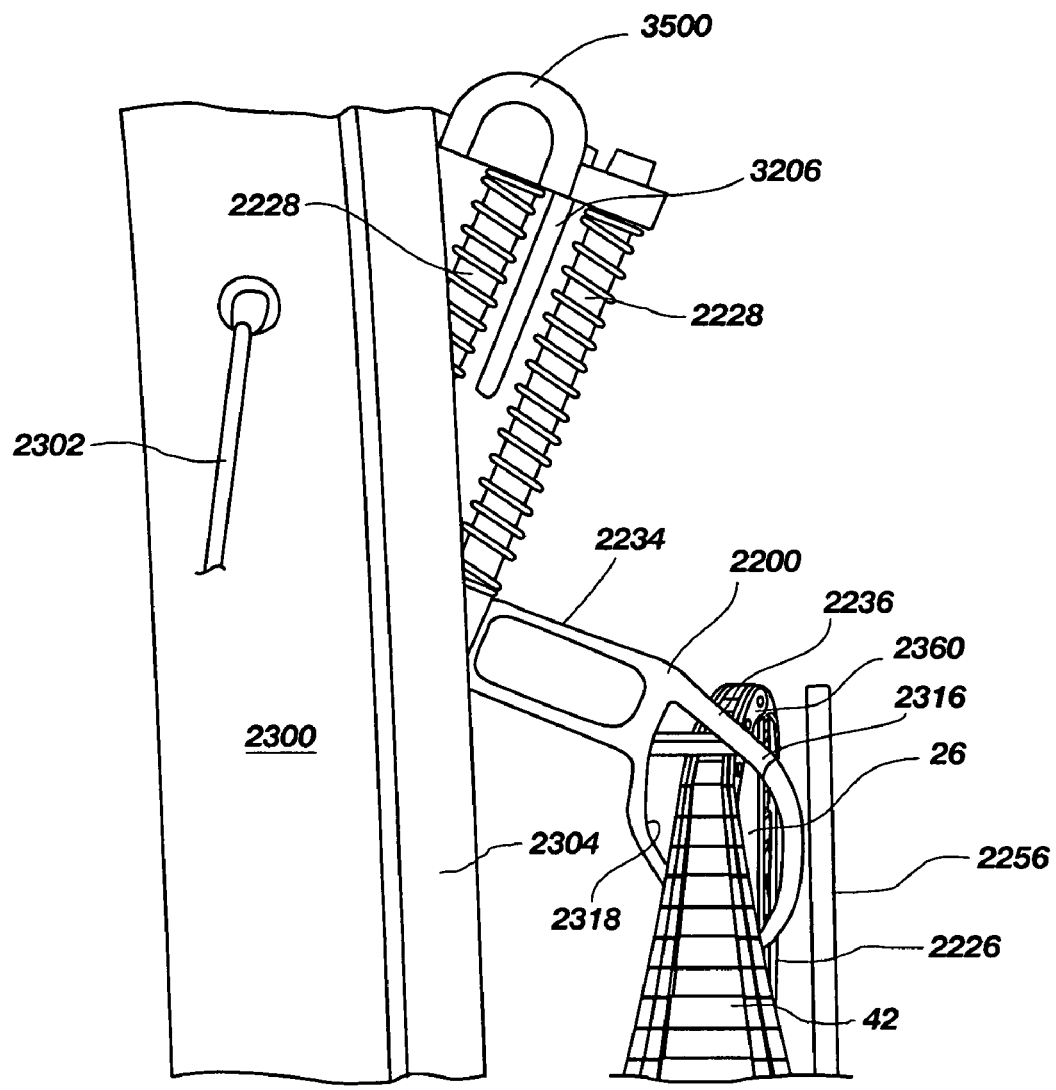
FIG. 23 is a drawing of a rear perspective view of the embodiment of the front derailleur 2200 shown in FIG. 22 engaging in a down-shift.

FIG. 23 is a drawing of a rear perspective view of the embodiment of the front derailleur 2200 shown in FIG. 22 as viewed along the direction of chain travel. Notice that the outside pulling surface 2316 of the chain guide 2236 acts upon the corner 2360 of the chain 42 and pulls the chain 42 down during a down-shift. Likewise, the inside lifting surface 2318 lifts an opposite corner of chain 42 during an up-shift. As shown in FIG. 23, the bicycle chain 42 at the point of contact 2360 of the outside pulling surface 2316 of the chain guide 2236 is actually lower than the bicycle chain 42 still on the largest chain ring 2226. During a down-shift, the outside pulling surface 2316 of chain guide 2236 acts upon the chain 42 to physically pull the chain down onto the next smaller chain ring (not shown for clarity). Other bicycle components shown in FIG. 23 include a portion of a bicycle rim 2300, tire 2304 and spoke 2302. FIG. 23 also illustrates two linear guide rods 2228 mounted to end cap 3500 with its associated guide arm stop screw 3206 and the guide arm 2234 attached to the chain guide 2236.

Figure 24:
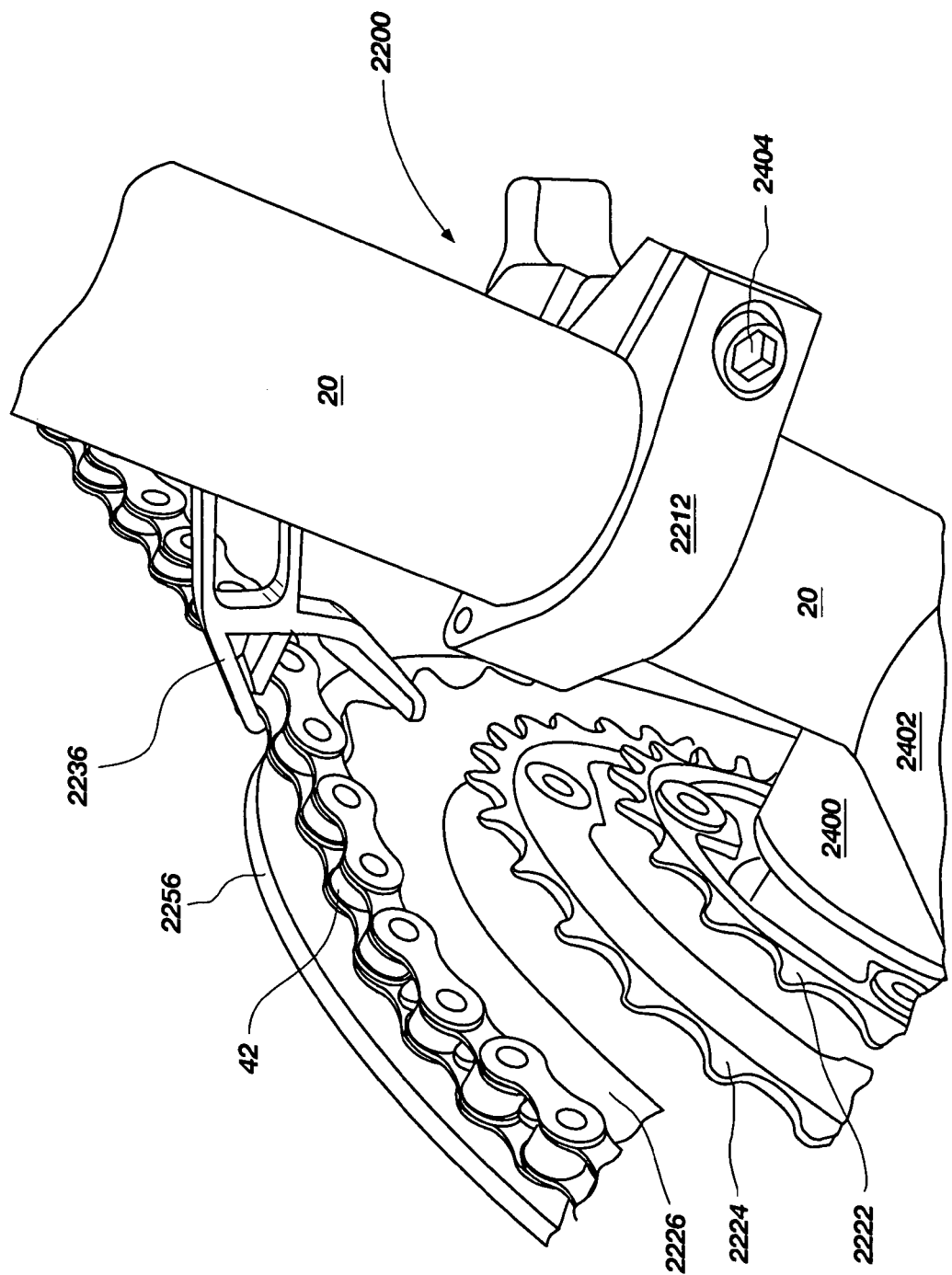
FIG. 24 is a drawing of a left upper front perspective view of the embodiment of the front derailleur shown in FIG. 22 engaging the bicycle chain in a down-shift.

FIG. 24 is a drawing of a left upper front perspective view of the embodiment of the front derailleur 2200 shown in FIGS. 22-23 engaging the chain 42 in a down-shift. The perspective illustrated in FIG. 24 shows the same pull down action of the chain guide 2236 acting upon the bicycle chain 42 as described with respect to FIG. 23 above. FIG. 24 also shows smallest chain ring 2222, middle chain ring 2224, and largest chain ring 2226. FIG. 24 further illustrates a bottom bracket 2400 which generally joins a seat tube 20 with a downtube 2402 and which houses crankset bearings (not shown). FIG. 24 also illustrates the mounting member 2212 clamped around seat tube 20 and secured by mounting bolt 2404. This view of a down-shift by front derailleur 2200 clearly illustrates how the chain guide 2236 acts to pull down upon the chain 42 in order to shift the chain 42 from the largest chain ring 2226 to the middle chain ring 2224. Conventional front derailleurs do not apply any downward force to a chain during a down-shift.

Figure 25:
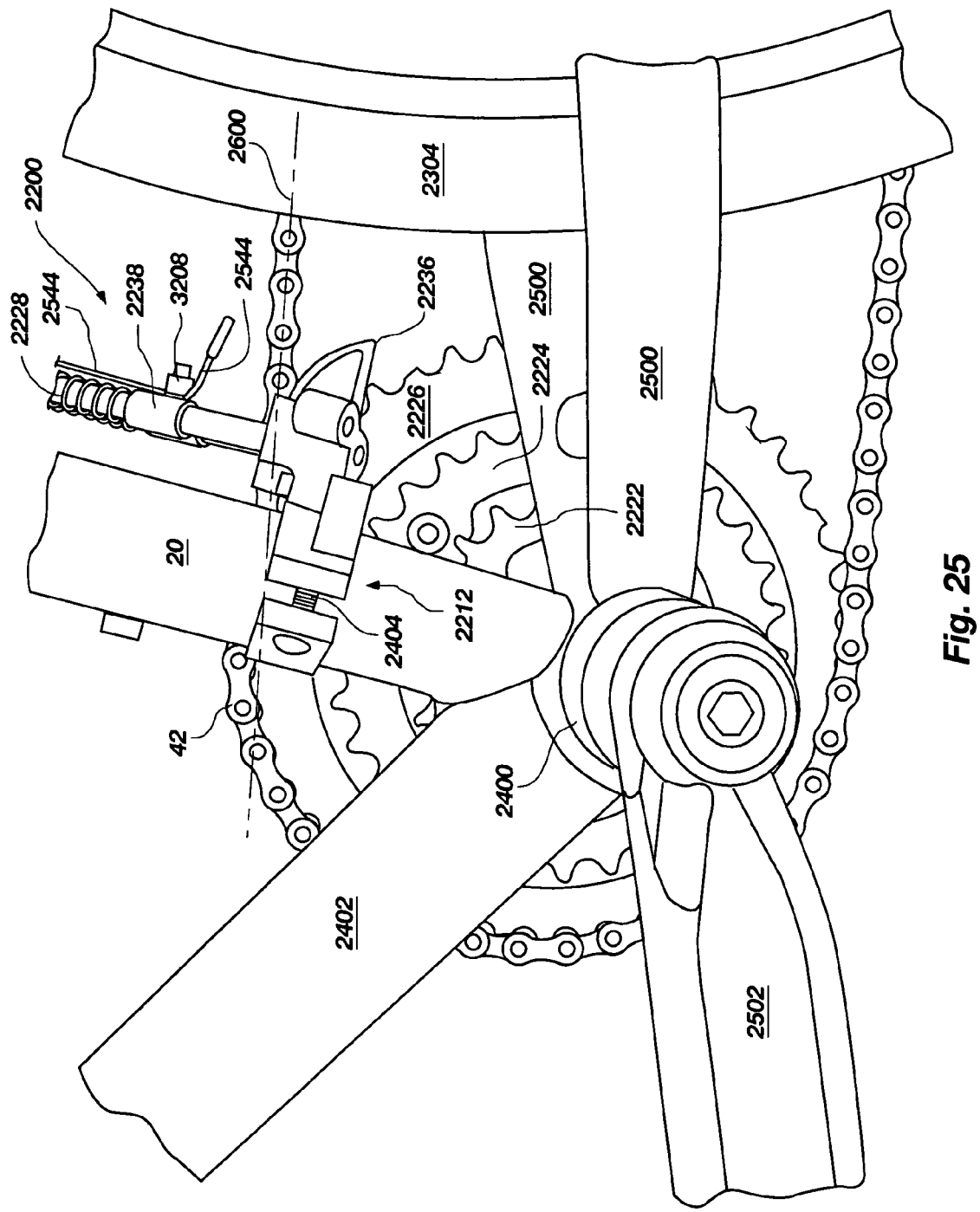
FIG. 25 is a drawing of a left side perspective view of the embodiment of the front derailleur shown in FIG. 22 engaging the chain in a downshift.

FIG. 25 is a drawing of a left side perspective view of the embodiment of the front derailleur 2200 shown in FIG. 22 engaging the bicycle chain 42 in a down-shift. As shown in FIG. 25, the chain guide 2236 pulls the bicycle chain 42 down during the down-shift, see dashed line 2600 which passes through the centerline of the chain 42 toward the rear of the bicycle (only a portion shown). Note also that the positioning assembly 2238 and chain guide 2236 are located outside of the bicycle main triangle, i.e., they are located behind the seat tube 20. FIG. 25 also shows a portion of downtube 2402, bottom bracket 2400 and seat stays 2500. FIG. 25 also illustrates tire 2304, left crank arm 2502, smallest chain ring 2222, middle chain ring 2224 and largest chain ring 2226. As further shown in FIG. 25, front derailleur 2200 is mounted to seat tube 20 with mounting member 2212 secured by mounting bolt 2404. Positioning assembly 2238 is moved up and down linear guide rods 2228 (only one shown) using a cable 2544 secured by cable anchor 3208.

Figure 26:
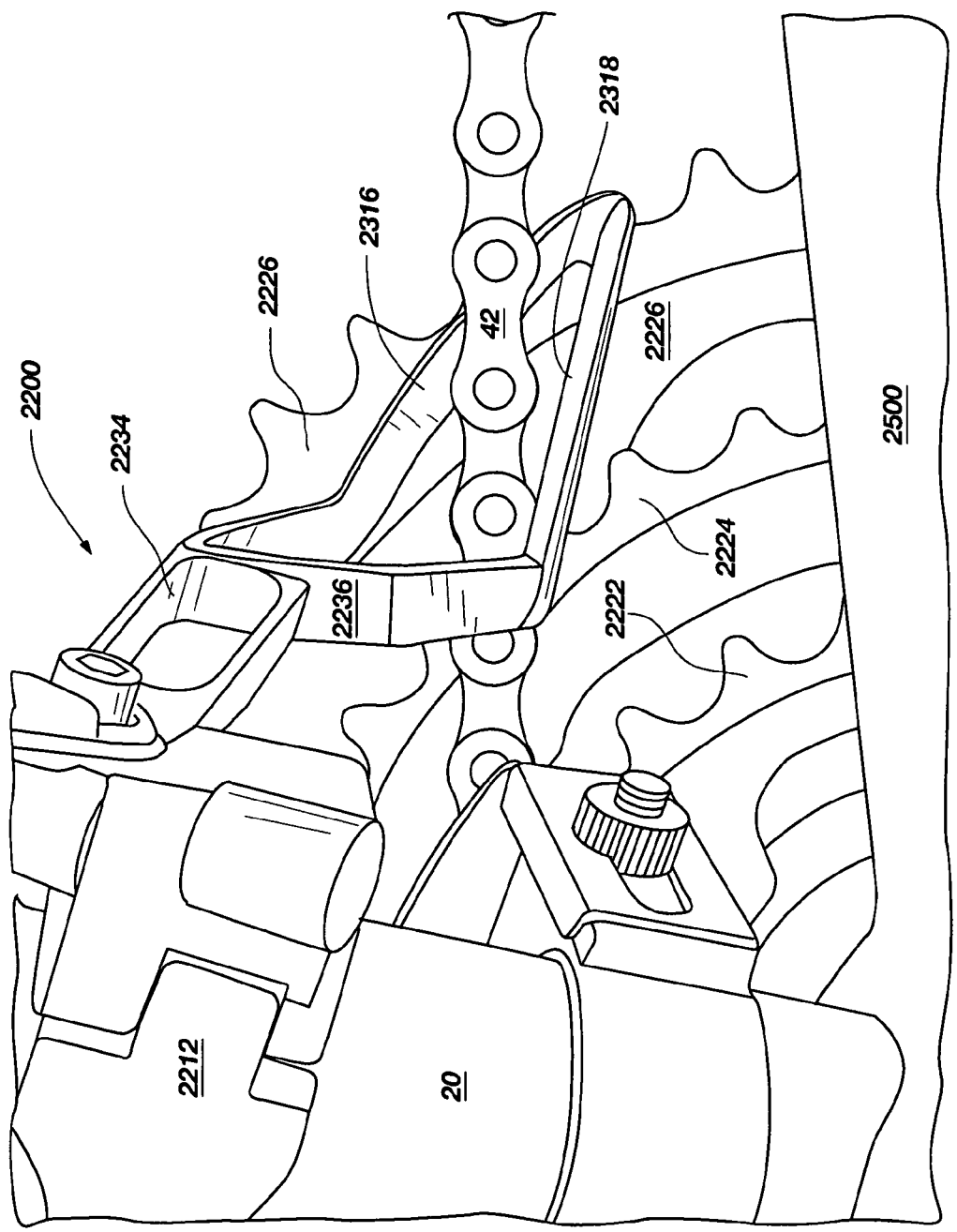
FIG. 26 is a drawing of a left side perspective view of still yet another embodiment of a front derailleur according to the present invention shown attached to a bicycle frame member.

FIG. 26 is a drawing of a left side perspective view of front derailleur 2200 according to an embodiment of the present invention, shown attached to a seat tube 20 or bicycle frame member 20. As shown in FIG. 26, the chain 42 passes through chain guide 2236 and rests on the smallest chain ring 2222. Chain guide 2236 includes outside pulling surface 2316 configured for pulling down on a corner of the chain 42 during a down-shift. Similarly, chain guide 2236 includes an inside lifting surface 2318 for lifting up on a corner of the chain 42 during an up-shift. Because of the unique linear movement of the chain guide 2236 of the front derailleur 2200 of the present invention, the chain guide 2236 can closely track the chain 42 from right behind the top of the chain ring in use, here the smallest chain ring 2222. Additionally, conventional front derailleur lateral movement would not allow such close tracking because the chain guide 2236 would slam into the largest chain ring 2226 during an up-shift. For example, in FIG. 26 the chain guide 2236 overlaps the largest chain ring 2226.

Figure 27:
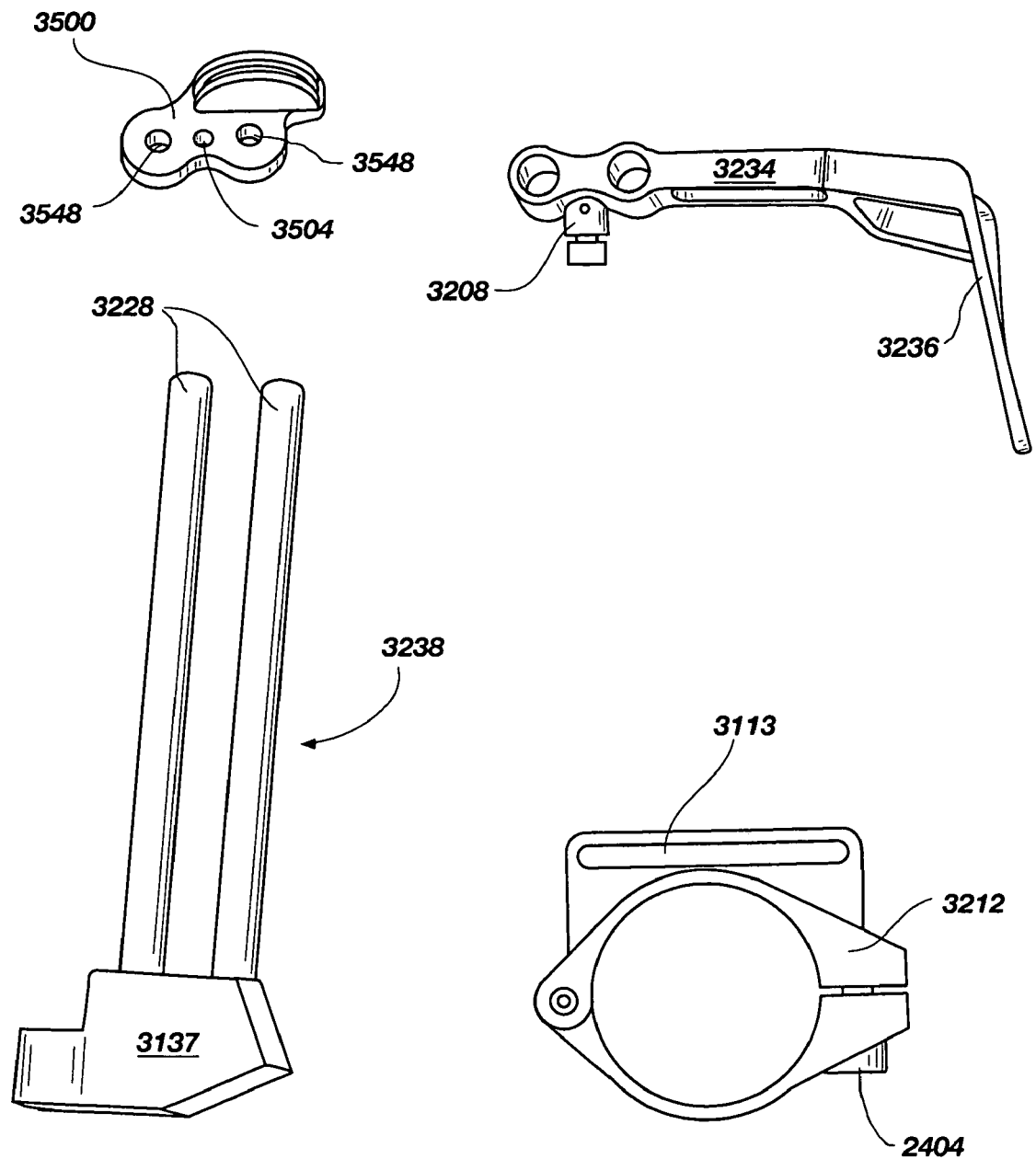
FIG. 27 is a drawing of component parts of the embodiment of the front derailleur shown in FIG. 28.
Figure 28:
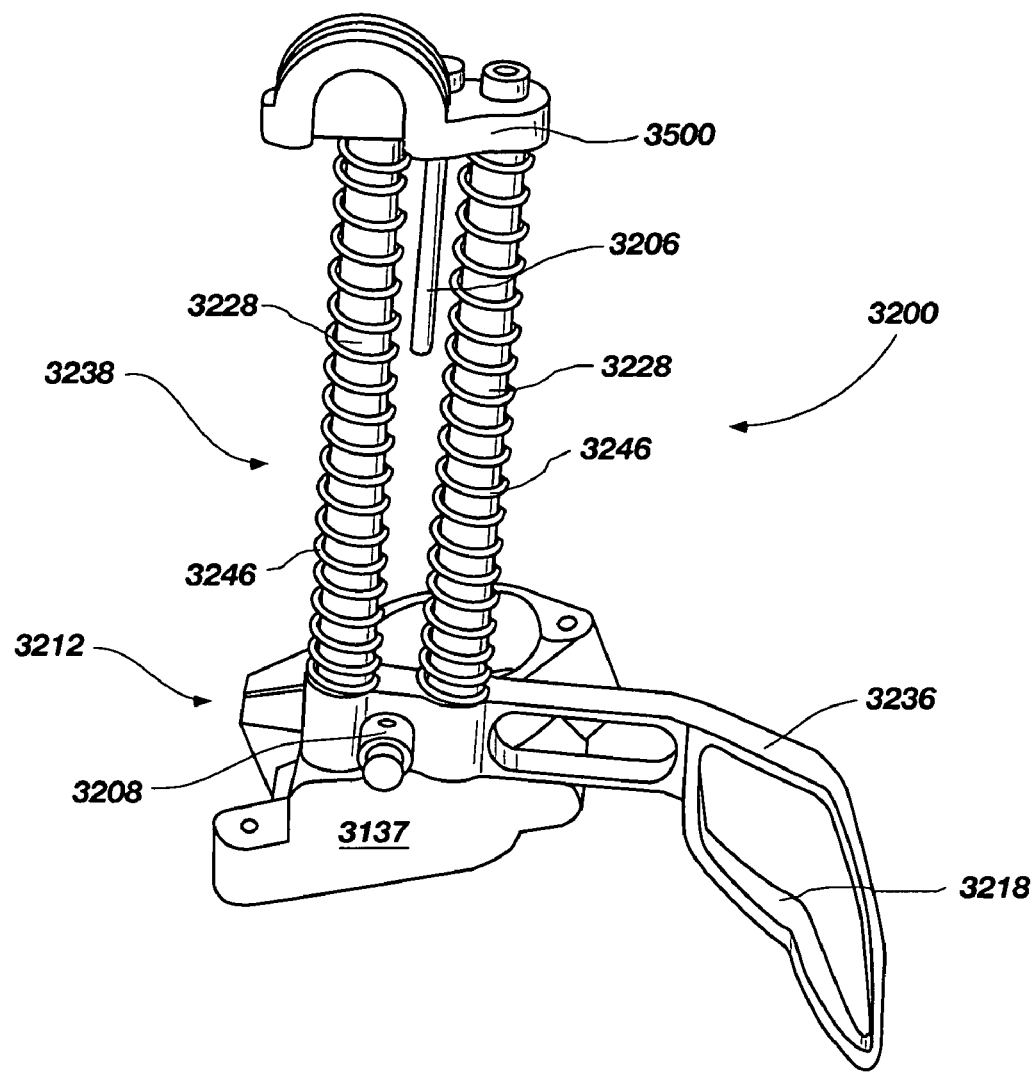
FIG. 28 is a drawing of a rear view of yet another embodiment of the front derailleur fully assembly, but not mounted on a bicycle.

FIG. 28 is a drawing of a rear view of the embodiment of the front derailleur 3200 standing alone. Front derailleur 3200 includes a mounting member 3212, positioning assembly 3238 and chain guide 3236. Chain guide 3236 includes an inside lifting surface 3218. The positioning assembly 3238 may include linear guide rods 3228, springs 3246, end cap 3500, guide arm stop screw 3206 and cable anchor 3208. FIG. 27 is a drawing of component parts of the embodiment of the front derailleur 3200 shown in FIG. 28. The component parts illustrated include end cap 3500, guide arm 3234 and chain guide 3236 with cable anchor 3208, mounting member 3212, mounting bolt 2404 and portions of positioning assembly 3238. End cap 3500 includes two holes 3548 for mounting the linear guide rods 3228. End cap 3500 further includes a threaded guide arm stop hole 3504 for receiving a guide arm stop screw 3206 (not show in FIG. 27, but see FIGS. 28-30). Portions of positioning assembly 3238 shown in FIG. 27 include two linear guide rods 3228 as shown disposed in a base member 3137. Mounting member 3212 shows an embodiment of a channel 3113 for lateral adjustment of positioning assembly 3238 and mounting bolt 2404.

Figure 29:
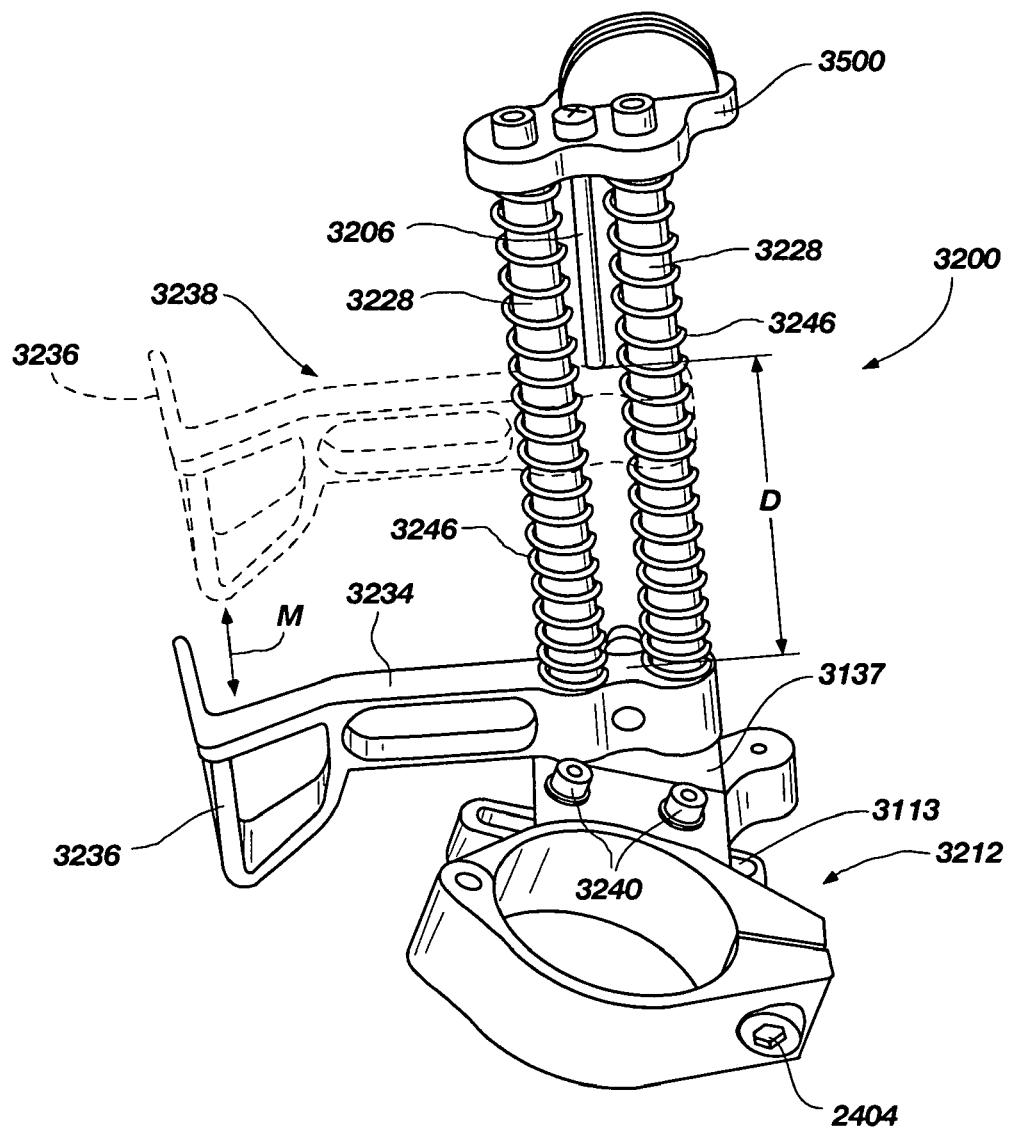
FIG. 29 is a drawing of a front view of the embodiment of the front derailleur shown in FIG. 28.
Figure 30:
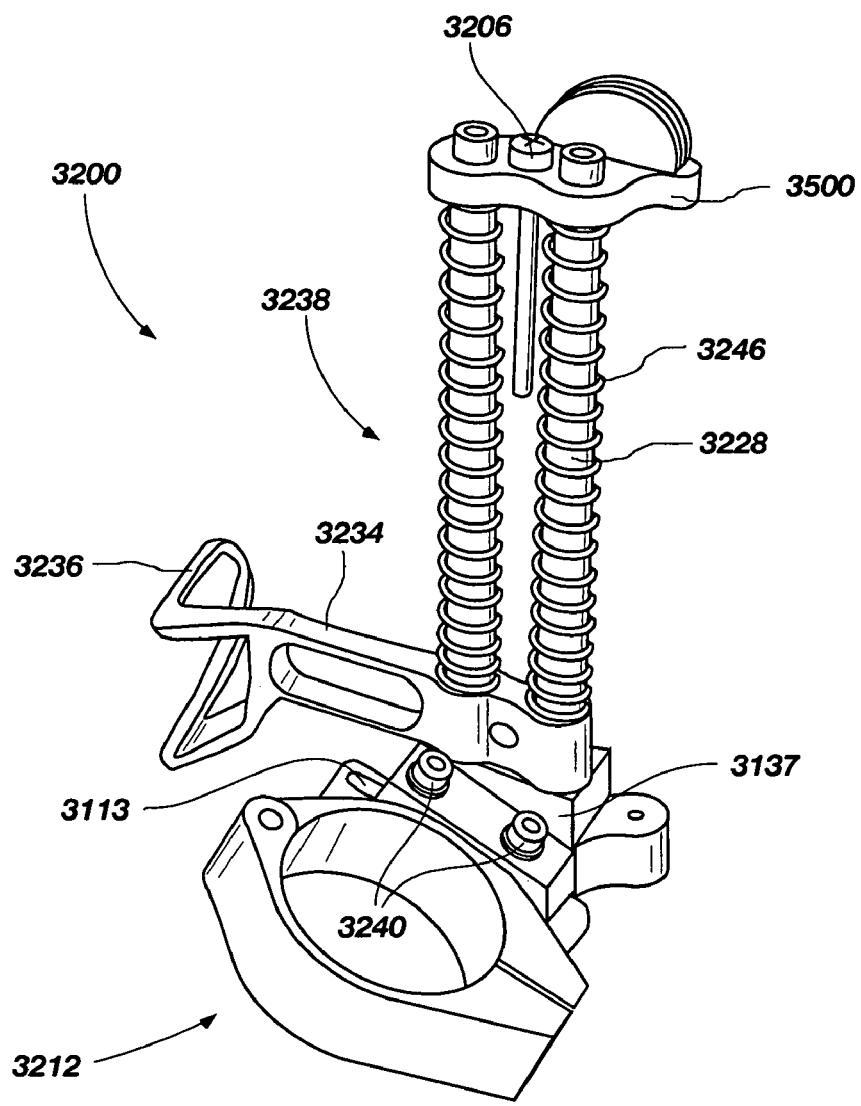
FIG. 30 is a drawing of a left front view of the embodiment of the front derailleur shown in FIG. 28.

FIGS. 29 and 30 are additional views of the front derailleur 3200 illustrated in FIG. 28. More specifically, FIG. 29 is a drawing of a front view of the embodiment of the front derailleur 3200. FIG. 30 is a drawing of a left front view of the embodiment of the front derailleur 3200. FIGS. 29-30 illustrate positioning assembly 3238 and mounting member 3212 of front derailleur 3200. Positioning assembly 3238 includes end cap 3500, guide arm stop screw 3206, two linear guide rods 3228 with springs 3246 mounted between end cap 3500 and base member 3137. Guide arm 3234 and its integral chain guide 3236 are disposed about linear guide rods 3228. Positioning assembly 3238 is secured to mounting member 3212 with screws 3240 to channel 3113. FIG. 29 also illustrates linear distance, D, which represents the linear travel, M (double pointed arrow), of guide arm 3234 and chain guide 3236 (shown in dotted line) from base member 3137 up to guide arm stop screw 3206 along linear guide rods 3228. Embodiments of front derailleur 3200 are capable of a linear distance exceeding about 2.5 centimeters for a crankset having three chain rings or a linear distance exceeding about 1.5 centimeters for a crankset having two chain rings.

Figure 31B:
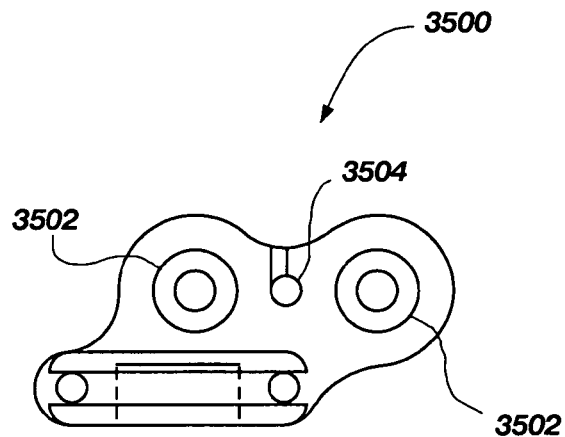
Figure 31B:
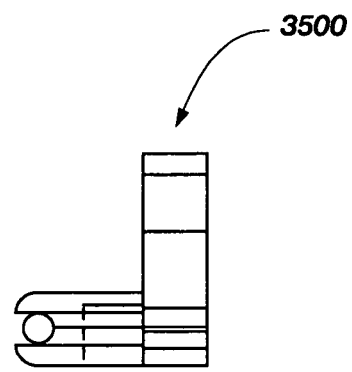
Figure 31B:
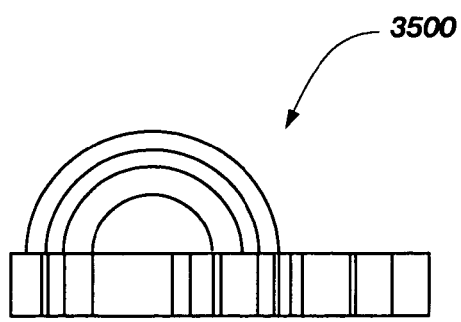

FIGS. 31A-31C are top, rear and right side drawings of an embodiment of an end cap 3500 shown in FIG. 27 and suitable for use with a positioning assembly 3238 in accordance with front derailleur 3200 of the present invention. End cap 3500 is an alternative embodiment to the pulley housing 400 described above. End cap 3500 is presently preferred over the pulley housing 400 embodiment because it has no moving parts. Referring to FIGS. 31A-31C, end cap 3500 includes two linear guide rod mounting holes 3502, a threaded guide arm stop hole 3504 for receiving a guide arm stop screw 3206 (not shown in FIGS. 31A-31C, but see FIGS. 28-30).

The outline of the openings or apertures associated with chain guides 90, 236, 236', 900, 1500, 2236, 3236 as described herein and when viewed in the direction of chain travel may be a simple convex polygon because the outline of the aperture forms a polygon having no internal angles greater than 180°. Stated another way, the outline of the opening or apertures associated with chain guides 90, 236, 236', 900, 1500, 2236, 3236 as described herein and when viewed in the direction of chain travel are simple convex polygons because all of the external angles of the outline of the aperture exceed 180°. This is a particularly distinctive feature of the embodiments of the present invention relative to conventional chain guides associated with conventional front derailleurs.

Figure 19:
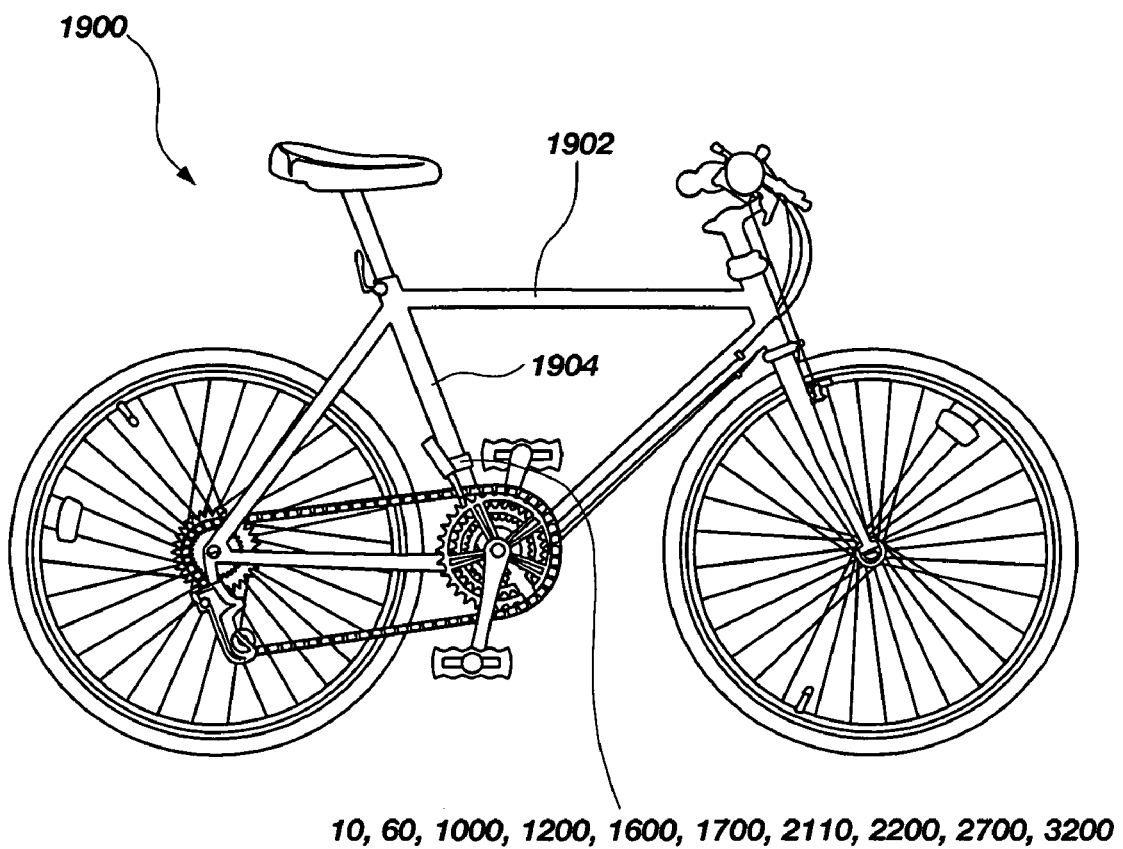
FIG. 19 is a perspective view of a bicycle with a front derailleur according to the present invention.

FIG. 19 is a perspective view of a bicycle 1900 including a bicycle frame 1902, a structural member 1904 for mounting a front derailleur 10, 60, 1000, 1200, 1600, 1700, 2110, 2200, 2700, 3200 in accordance with the present invention. Structural member may be a seat tube or a stub of a seat tube. Bicycle 1900 may be a mountain bicycle (as shown in FIG. 19), a road bicycle, a cyclo-cross bicycle or any other bicycle requiring a front derailleur. Front derailleurs 10, 60, 1000, 1200, 1600, 1700, 2110, 2200, 2700 and 3200 may be used with any type of bicycle 1900 requiring a front derailleur. Additionally, front derailleur 10, 60, 1000, 1200, 1600, 1700, 2110, 2200, 2700 and 3200 may be configured for use with any make or style of other bicycle components.

While various elements of the front derailleur 10, 60, 1000, 1200, 1600, 1700, 2110, 2200, 2700, 3200 have been discussed as being formed from stainless steel, other materials may be utilized in the construction of the front derailleur 10, 60, 1000, 1200, 1600, 1700, 2110, 2200, 2700, 3200 depending on the overall intended use of the bicycle to which the front derailleur 10, 60, 1000, 1200, 1600, 1700, 2110, 2200, 2700, 3200 will be mounted. Some of the contemplated materials would include carbon steel, aluminum, titanium, plastic, Teflon®-like materials or a composite material such as glass-impregnated plastic or resin-impregnated carbon fiber. Each of these materials has various desirable qualities and selection of material may depend on numerous factors such as corrosion protection, wear characteristics, strength-to-weight ratio and cost to manufacture and assemble. The selection of appropriate materials is within the knowledge of one skilled in the art.

Although this invention has been described with reference to particular illustrated embodiments, the invention is not limited to the embodiments described. Rather, it should be understood that the embodiments described herein are merely exemplary and that a person skilled in the art may make many variations and modifications without departing from the spirit and scope of the invention as defined by the following claims.

What is claimed is:

1. A front derailleur for shifting a bicycle chain, comprising:
    a mounting member configured for attachment to a structural member of a bicycle frame;
    a chain guide comprising an inside lifting surface oriented at an angle relative to a plane passing through a bicycle chain link plate, the plane perpendicular to a drive axis of a crank set, the inside lifting surface applying an upward force to a cross-sectional corner of the bicycle chain during an up-shift; and
    a positioning assembly disposed between the mounting member and the chain guide for moving the chain guide in a path upward and away from the mounting member during the up-shift.

2. The front derailleur according to claim 1, wherein the chain guide during shifting is at all times behind a bottom bracket or other structural member to which the mounting member is configured for attachment relative to a front end of the bicycle frame.

3. The front derailleur according to claim 1, wherein movement of the chain guide during an up-shift is toward the rear of the bicycle frame.

4. The front derailleur according to claim 1, wherein movement of the chain guide during a down-shift is toward the front of the bicycle frame.

5. The front derailleur according to claim 1, wherein full movement of the chain guide extends over a linear distance exceeding about 2.5 centimeters for a crankset having three chain rings.

6. The front derailleur according to claim 1, wherein full movement of the chain guide extends over a linear distance exceeding about 1.5 centimeters for a crankset having two chain rings.

7. The front derailleur according to claim 1, wherein the chain guide is configured to vertically lift up on the bicycle chain during an up-shift even without the presence and motion of the next biggest chain ring.

8. The front derailleur according to claim 1, wherein the chain guide is configured to vertically pull down on the bicycle chain during a down-shift.

9. The front derailleur according to claim 1, wherein the positioning assembly comprises two linear guide rods.

10. The front derailleur according to claim 1, wherein the positioning assembly is laterally adjustable relative to the mounting member.

11. The front derailleur according to claim 1, wherein the positioning assembly further comprises an end cap for receiving linear guide rods and configured for guiding a shifter cable and comprising a threaded hole configured for receiving a derailleur stop adjustment screw.

12. A chain guide of a front derailleur for shifting a bicycle chain, comprising:
    an inside lifting surface oriented at an angle relative to a plane passing through a bicycle chain link plate, the plane perpendicular to a drive axis of a crank set, the inside lifting surface lifting up vertically on a corner of the bicycle chain as viewed in cross-section during an up-shift; and
    an outside pulling surface oriented at another angle relative to the plane and pulling down vertically on an opposite corner of the bicycle chain as viewed in cross-section during a down-shift.

13. The chain guide for a front derailleur according to claim 12, wherein the chain guide further comprises an aperture having an outline configured as a simple convex polygon when viewed in a direction of bicycle chain travel.

14. The chain guide for a front derailleur according to claim 13, wherein the inside lifting surface and the outside pulling surface comprise sides of the simple convex polygon.

15. The chain guide for a front derailleur according to claim 12, further configured for positioning by linear guide rods.

16. The chain guide for a front derailleur according to claim 12, further comprising stainless steel.

17. The front derailleur according to claim 1, wherein the positioning assembly moves the chain guide in a linear path.

18. A bicycle front derailleur, comprising:
- a mounting member configured for attachment to a structural member of a bicycle frame;
- a chain guide comprising an outside pulling surface oriented at an angle relative to a plane passing through any bicycle chain link plate, the plane perpendicular to a drive axis of a crank set; and
- a positioning means disposed between the mounting member and the chain guide for moving the chain guide in a path downward and toward the mounting member during a down-shift, causing the outside pulling surface to apply a vertically downward force on a cross-sectional corner of a bicycle chain during the down-shift.

19. The front derailleur according to claim 18, wherein the positioning assembly moves the chain guide in a linear path.

* * * * *